(12) United States Patent
Matsumoto

(10) Patent No.: US 10,193,167 B2
(45) Date of Patent: Jan. 29, 2019

(54) POWER CONDITIONING SYSTEM AND CONTROL METHOD THEREFOR

(71) Applicant: NISSAN MOTOR CO., LTD., Yokohama-shi, Kanagawa (JP)

(72) Inventor: Michihiko Matsumoto, Kanagawa (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 0 days.

(21) Appl. No.: 15/575,020

(22) PCT Filed: May 21, 2015

(86) PCT No.: PCT/JP2015/064629
§ 371 (c)(1),
(2) Date: Nov. 17, 2017

(87) PCT Pub. No.: WO2016/185609
PCT Pub. Date: Nov. 24, 2016

(65) Prior Publication Data
US 2018/0145350 A1 May 24, 2018

(51) Int. Cl.
*H01M 8/04* (2016.01)
*H01M 8/04082* (2016.01)
(Continued)

(52) U.S. Cl.
CPC ..... *H01M 8/04082* (2013.01); *B60L 11/1887* (2013.01); *H01M 8/04634* (2013.01);
(Continued)

(58) Field of Classification Search
CPC ......... H01M 8/04082; H01M 8/04634; H01M 8/04649; H01M 8/04895; H01M 16/006;
(Continued)

(56) References Cited

U.S. PATENT DOCUMENTS

2004/0174072 A1* 9/2004 Bourilkov ................ H02J 7/34
307/66
2010/0261082 A1 10/2010 Kajiwara et al.
(Continued)

FOREIGN PATENT DOCUMENTS

EP 2 112 706 A1 10/2009
JP 2008-91319 A 4/2008
(Continued)

*Primary Examiner* — Raymond Alejandro
(74) *Attorney, Agent, or Firm* — Foley & Lardner LLP

(57) ABSTRACT

A power conditioning system includes a fuel cell connected to a load, a fuel cell converter connected between the fuel cell and the load and converting an output voltage of the fuel cell at a predetermined required voltage ratio, and a battery connected to the load in parallel to the fuel cell and serving as a power supply source different from the fuel cell. The power conditioning system includes an impedance measuring device configured to measure an impedance of the fuel cell by outputting alternating currents between a positive electrode and an intermediate point of the fuel cell and between the intermediate point and a negative electrode of the fuel cell, and a current bypass path configured to couple the fuel cell and the load while bypassing the fuel cell converter. The power conditioning system includes a current cut-off unit configured to provide on the current bypass path, the current cut-off unit electrically cutting off the current bypass path when the impedance of the fuel cell is measured by the impedance measuring device.

7 Claims, 12 Drawing Sheets

(51) Int. Cl.
　　*B60L 11/18*　　　(2006.01)
　　*H01M 16/00*　　　(2006.01)
　　*H01M 8/04537*　　(2016.01)
　　*H01M 8/04858*　　(2016.01)
　　*B60L 3/00*　　　　(2006.01)

(52) U.S. Cl.
　　CPC ... *H01M 8/04649* (2013.01); *H01M 8/04895* (2013.01); *H01M 16/006* (2013.01); *B60L 3/0053* (2013.01); *H01M 2250/20* (2013.01)

(58) Field of Classification Search
　　CPC ............ H01M 2250/20; B60L 11/1887; B60L 3/0053
　　See application file for complete search history.

(56) References Cited

U.S. PATENT DOCUMENTS

2012/0308850 A1* 12/2012 Bernard ............ H01M 8/04753
　　　　　　　　　　　　　　　　　　　　　429/9
2013/0249562 A1　9/2013 Sakai et al.
2014/0335433 A1* 11/2014 Jomori ................ H01M 8/0488
　　　　　　　　　　　　　　　　　　　　　429/432
2015/0276888 A1　10/2015 Sakai

FOREIGN PATENT DOCUMENTS

| JP | 2015-35840 A | 2/2015 |
|----|---|---|
| WO | WO 2012/077450 A1 | 6/2012 |
| WO | WO 2014/057868 A1 | 4/2014 |

* cited by examiner

POWER CONDITIONING SYSTEM AND CONTROL METHOD THEREFOR

TECHNICAL FIELD

The present invention relates to a power conditioning system with a fuel cell, an impedance measuring device for measuring an impedance of the fuel cell, a high-voltage battery and a DC/DC converter and a control method therefor.

BACKGROUND ART

Among power conditioning systems with a fuel cell, a power conditioning system is known which can supply output power of a fuel cell to a load by supplying fuel gas (e.g. hydrogen) and oxidant gas (e.g. air) to the fuel cell according to a request of the load connected to the fuel cell.

In the power conditioning system as described above, to control an operating state of the fuel cell, alternating-current components of an output current and an output voltage of the fuel cell are measured while an alternating-current voltage signal is output, for example, by an impedance measuring device, a controller and the like, and an internal impedance of the fuel cell is estimated by computing these measured alternating-current components.

WO2012/077450 discloses an internal resistance measuring device for measuring an internal resistance (internal impedance) of a laminated battery in which a plurality of power generation elements are laminated. In this internal resistance measuring device, the internal resistance of the laminated battery is measured on the basis of potential differences between potentials on positive and negative electrode sides of the laminated battery and a potential on a part between the positive and negative electrode sides.

However, although a travel motor or the like is illustrated as a load device of the device, no specific configuration is disclosed in WO2012/077450. Here, the present applicant proposes a fuel cell system (power condition system) with a battery (high-voltage secondary battery) and a fuel cell provided electrically in parallel to the battery.

In a power condition system in which a battery and a fuel cell are arranged in parallel, a DC/DC converter is provided at least on an output side of either one of the battery and the fuel cell to link (synchronize) an output of the battery and an output of the fuel cell. It is considered to utilize the internal resistance measuring device as described above to measure an impedance of the fuel cell in such a power condition system.

SUMMARY OF INVENTION

The power conditioning system with the DC/DC converter as described above is used to drive a motor of a vehicle with a fuel cell. If there is a load variation in a motor or the like of a vehicle in a power condition system with a DC/DC converter on a battery side, a signal corresponding to the load variation may be input to the fuel cell from an inverter or the like. If such a signal has a frequency close to a frequency of an alternating-current signal (alternating-current signal) used in the internal resistance measuring device, there is a possibility that the alternating current supplied from the internal resistance measuring device to the fuel cell flows also to the load side.

In such a situation, the accuracy of impedance measurement of the fuel cell is extremely reduced. If the measured impedance deviates, there is a problem that a wet state of the fuel cell cannot be estimated and the fuel cell possibly enters a state of poor power generation due to over-drying in the fuel cell or flooding (over-wetting).

On the other hand, in the case of providing the DC/DC converter on the fuel cell side, since an impedance of the DC/DC converter itself is high, the flow of a load variation component to the fuel cell side can be suppressed. However, since the impedance of the DC/DC converter is high, there is a problem that output loss of the fuel cell is caused by the DC/DC converter and the DC/DC converter generates heat due to such loss.

The present invention was made, focusing on the problems described above and aims to provide a power conditioning system capable of accurately measuring an impedance of a fuel cell while reducing output loss of the fuel cell even if a load variation possibly occurs in a load and a control method therefor.

According to one aspect of the present invention, a power conditioning system includes a fuel cell connected to a load, a fuel cell converter connected between the fuel cell and the load and converting an output voltage of the fuel cell at a predetermined required voltage ratio, and a battery connected to the load in parallel to the fuel cell and serving as a power supply source different from the fuel cell. The power conditioning system includes an impedance measuring device configured to measure an impedance of the fuel cell by outputting alternating currents between a positive electrode and an intermediate point of the fuel cell and between the intermediate point and a negative electrode of the fuel cell, and a current bypass path configured to couple the fuel cell and the load while bypassing the fuel cell converter. The power conditioning system includes a current cut-off unit configured to provide on the current bypass path, the current cut-off unit electrically cutting off the current bypass path when the impedance of the fuel cell is measured by the impedance measuring device.

DESCRIPTION OF EMBODIMENTS

Hereinafter, an embodiment of the present invention is described with reference to the accompanying drawings.

Figure 1:
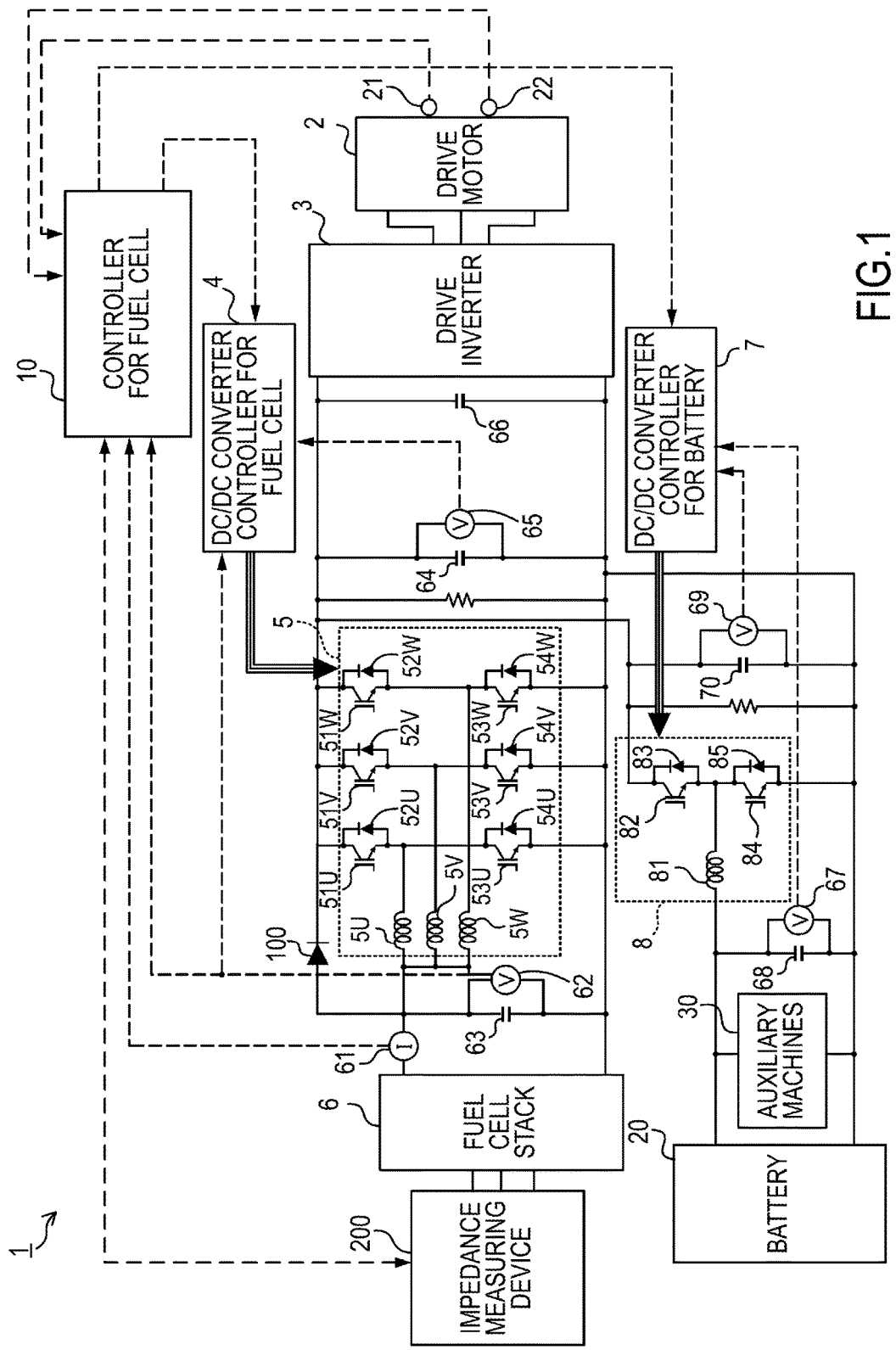
FIG. 1 is a diagram showing an overall configuration of a power conditioning system for fuel cell in one embodiment of the present invention.

FIG. 1 is a diagram showing an overall configuration of a power conditioning system for fuel cell 1 (hereinafter, merely referred to as the "power conditioning system 1") in one embodiment of the present invention. The power conditioning system 1 of the present invention includes a high-energy battery and is used in a vehicle using a fuel cell as a drive source. This power conditioning system 1 is, for example, installed in an electric vehicle configured to be driven by a drive motor 2 as shown in FIG. 1. It should be noted that this power conditioning system 1 can be also applied to loads such as devices other than fuel cell vehicles (electric vehicles utilizing a fuel cell) if a fuel cell is used as a drive source.

The power conditioning system 1 of the present embodiment includes, as shown in FIG. 1, a fuel cell stack 6, a DC/DC converter 5 for the fuel cell stack 6 (fuel cell converter), a high-energy battery 20 (hereinafter, merely referred to as the "battery 20"), auxiliary machines 30, and a DC/DC converter 8 for the battery 20 (battery converter). Further, the power conditioning system 1 includes a controller for fuel cell 10 for controlling the entire power conditioning system 1 including the fuel cell stack 6, a DC/DC converter controller for fuel cell 4 for controlling the DC/DC converter 5 and a DC/DC converter controller for battery 7 for controlling the DC/DC converter 8. Furthermore, the power conditioning system 1 includes the drive motor 2 serving as a load and a drive inverter 3 for controlling to switch direct-current power input from the fuel cell stack 6 and the battery 20 to alternating-current power to the drive motor 2.

Further, the power conditioning system 1 of the present embodiment includes an impedance measuring device 200 for measuring impedances of fuel cells constituting the fuel cell stack 6. A specific configuration of the impedance measuring device 200 is described later.

In the present embodiment, a current bypass path BR along which an output current of the fuel cell stack 6 bypasses the DC/DC converter 5 is provided between an output terminal on a positive electrode side of the DC/DC converter 5 and an output terminal on a positive electrode side of the fuel cell stack 6. Specifically, this current bypass path BR couples the fuel cell stack 6 and the drive motor 2 serving as the load via the drive inverter 3.

Further, a diode 100 serving as a current cut-off unit configured to cut off the flow of a current from the side of the drive motor 2 serving as the load to the fuel cell stack 6 is provided on the current bypass path BR. The diode 100 is arranged such that a direction from the fuel cell stack 6 toward the drive inverter 3 is a forward direction and functions as a current cut-off unit of the present invention. Thus, if the DC/DC converter 5 for the fuel cell stack 6 is boosting, a current backflow from the output side of the DC/DC converter 5 to the fuel cell stack 6 can be prevented by this diode 100.

The DC/DC converter 5 for the fuel cell stack 6 is provided between the fuel cell stack 6 and the drive inverter 3 (drive motor 2). This DC/DC converter 5 is for converting an output voltage of the fuel cell stack 6 into an input voltage of the drive inverter 3 at a predetermined required voltage ratio. In the present embodiment, the DC/DC converter 5 is a step-up converter for boosting the output voltage of the fuel cell stack 6 to a voltage suitable as a drive voltage of the drive motor 2.

In the present embodiment, the DC/DC converter 5 is constituted by a three-phase converter. Thus, this DC/DC converter 5 is referred to as a multi-phase converter 5 in some cases below. It should be noted that the number of phases of the multi-phase converter 5 may be more than three.

The multi-phase converter 5 is composed of three converters including a U-phase converter, a V-phase converter and a W-phase converter as shown in FIG. 1. Three reactors 5U, 5V and 5W are respectively connected to the U-phase, V-phase and W-phase converters. It should be noted that the U-phase, V-phase and W-phase converters are similarly configured. Thus, the configuration of the U-phase converter is described as a representative below.

The U-phase converter includes the reactor 5U, a switching element 51U on a step-down side, a rectifying diode 52U, a switching element 53U on a step-up side and a reflux diode 54U. The switching element 51U is connected in inverse parallel to the rectifying diode 52U, and the switching element 53U is connected in inverse parallel to the reflux diode 54U. These switching elements 51U, 53U are, for example, constituted by IGBTs (Insulated Gate Bipolar Transistors).

One end of the reactor 5U is connected to the output terminal on the positive electrode side of the fuel cell stack 6 via a current sensor 61, and the other end is connected to one ends of the switching element 51U and the rectifying diode 52U and one ends of the switching elements 53U and the reflux diode 54U. The other ends of the switching element 51U and the rectifying diode 52U are connected to a cathode terminal of the diode 100 and an input terminal on a positive electrode side of the drive inverter 3. Further, the other ends of the switching element 53U and the reflux diode 54U are connected to an output terminal on a negative electrode side of the fuel cell stack 6 and an input terminal on a negative electrode side of the drive inverter 3.

A voltage sensor 62 for detecting an output voltage of the fuel cell stack 6 and a capacitor 63 for smoothing the output voltage of the fuel cell stack 6 are connected in parallel between the output terminals of the fuel cell stack 6. The capacitor 63 is for smoothing the output voltage of the fuel cell stack 6, whereby a ripple component in the output of the fuel cell stack 6 can be reduced.

Further, a capacitor 64 for smoothing an output voltage of the multi-phase converter 5 and a voltage sensor 65 for detecting the output voltage of the multi-phase converter 5 (input voltage of the drive inverter 3) are connected in parallel between the output terminals of the multi-phase converter 5. A ripple component in the output of the multi-phase converter 5 can be reduced by this capacitor 64.

Furthermore, a capacitor 66 for smoothing the input voltage of the drive inverter 3 is provided between a connection terminal between the output terminal of the multi-phase converter 5 and the output terminal of the DC/DC converter 8 and an input terminal of the drive inverter 3.

The fuel cell stack 6 is connected to the drive motor 2 serving as the load of the power conditioning system 1 via the multi-phase converter 5 and the drive inverter 3. The fuel cell stack 6 is a laminated battery for generating power according to an electrical load such as the drive motor 2 by receiving the supply of cathode gas (oxidant gas) and anode gas (fuel gas) from unillustrated cathode gas supplying/discharging device and anode gas supplying/discharging device. For example, several hundreds of fuel cells are laminated in the fuel cell stack 6.

Many devices such as anode gas supply/discharge passages, cathode gas supply/discharge passages, pressure control valves provided in each passage, a cooling water circulation passage and a cooling water pump, a radiator and a cooling device for the fuel cell stack 6 are connected to the fuel cell stack 6. However, since these are less relevant to technical features of the present invention, these are not shown.

The drive motor 2 is for driving the vehicle in which the power conditioning system 1 of the present embodiment is installed. The drive inverter 3 is for converting direct-current power supplied from the fuel cell stack 6 and the battery 20 into alternating-current power and supplying the converted alternating-current power to the drive motor 2. The drive motor 2 is rotationally driven by the alternating-current power supplied by the drive inverter 3 and supplies rotational energy thereof to a subsequent stage. It should be noted that, although not shown, the drive motor 2 is coupled to drive wheels of the vehicle via differentials and shafts.

During downhill travel or deceleration of the vehicle, regenerative power of the drive motor 2 is supplied to the battery 20 via the drive inverter 3 and the DC/DC converter 8 and the battery 20 is charged according to a state of charge of the battery 20. Further, during power travel of the vehicle, the drive motor 2 is rotated by power generated by the fuel cell stack 6 and power accumulated in the battery 20, and rotational energy thereof is transmitted to the unillustrated drive wheels of the vehicle.

A motor rotation speed detection unit 21 configured to detect a motor rotation speed of the drive motor 2 and a motor torque detection unit 22 configured to detect a motor torque of the drive motor 2 are provided near the drive motor 2. The motor rotation speed and motor torque of the drive motor 2 detected by these detection units 21, 22 are output to the controller for fuel cell 10.

The battery 20 is a chargeable/dischargeable secondary battery and, for example, a lithium ion battery of 300 V (volts). The battery 20 is connected to the auxiliary machines 30 and constitutes a power supply for the auxiliary machines 30. Further, the battery 20 is connected to the drive inverter 3 and the DC/DC converter 5 via the DC/DC converter 8. Specifically, the battery 20 is connected to the drive motor 2 serving as the load of the power conditioning system 1 in parallel to the fuel cell stack 6.

A voltage sensor 67 for detecting an output voltage of the battery 20 and a capacitor 68 for smoothing the output voltage of the battery 20 are connected to an output terminal of the battery 20 in parallel to the auxiliary machines 30.

The DC/DC converter 8 for the battery 20 is provided between the battery 20 and the drive inverter 3 (drive motor 2). This DC/DC converter 8 is for converting an output voltage of the battery 20 into an input voltage of the drive inverter 3 at a predetermined required voltage ratio. It should be noted that an output voltage of the DC/DC converter 8 is controlled to be linked (synchronized) with the output voltage of the multi-phase converter 5 as described later.

In the present embodiment, the DC/DC converter 8 is a single-phase converter unlike the multi-phase converter 5 for the fuel cell stack 6. As shown in FIG. 1, this DC/DC converter 8 includes a reactor 81, a switching element 82 on a step-down side, a rectifying diode 83, a switching element 84 on a step-up side and a reflux diode 85. The switching element 82 is connected in inverse parallel to the rectifying diode 83, and the switching element 84 is connected in inverse parallel to the reflux diode 85. These switching elements 82, 84 are, for example, constituted by IGBTs.

One end of the reactor 81 is connected to an output terminal on a positive electrode side of the battery 20 and the other end is connected to one ends of the switching element 82 and the rectifying diode 83 and one ends of the switching element 84 and the reflux diode 85. The other ends of the switching element 82 and the rectifying diode 83 are connected to the input terminal on the positive electrode side of the drive inverter 3. Further, the other ends of the switching element 84 and the reflux diode 85 are connected to an output terminal on a negative electrode side of the battery 20 and the input terminal on the negative electrode side of the drive inverter 3.

A capacitor 70 for smoothing the output voltage of the DC/DC converter 8 and a voltage sensor 69 for detecting the output voltage of the DC/DC converter 8 (input voltage of the drive inverter 3) are connected between the output terminals of the DC/DC converter 8.

The auxiliary machines 30 are mainly components accessory to the fuel cell stack 6 and include the cathode gas supplying/discharging device, the anode gas supplying/discharging device, an unillustrated air compressor, the cooling pump and the like as described above. It should be noted that if various components of the auxiliary machines 30 are pieces of light electrical equipment, an unillustrated step-down DC/DC converter may be provided between the battery 20 and the targeted auxiliary machine 30. Instead of that, an unillustrated light electrical battery for light electrical equipment may be provided.

Although not shown, the controller for fuel cell 10 is constituted by a microcomputer with a central processing unit (CPU), a read-only memory (ROM), a random access memory (RAM) and an input/output interface (I/O interface). An output current value and an output voltage value of the fuel cell stack 6 detected by the current sensor 61 and the voltage sensor 62 are input to the controller for fuel cell 10.

Further, the controller for fuel cell 10 outputs commands for operating the multi-phase converter 5 and the DC/DC converter 8 to the DC/DC converter controller for fuel cell 4 and the DC/DC converter controller for battery 7 on the basis of the output current value and output voltage value of the fuel cell stack 6 input from the respective sensors 61, 62 and the motor rotation speed and motor torque of the drive motor 2 input from the respective detection units 21, 22.

Furthermore, the controller for fuel cell 10 outputs an impedance calculation request of the fuel cell stack 6 to the impedance measuring device 200 when a wet state of the fuel cell stack 6 satisfies a predetermined condition. In response to that, the impedance measuring device 200 measures the impedance of the fuel cell stack 6 and outputs that measurement result to the controller for fuel cell 10 as described later.

The DC/DC converter controller for fuel cell 4 is for controlling the multi-phase converter 5 on the basis of a command from the controller for fuel cell 10. The DC/DC converter controller for fuel cell 4 ON/OFF controls the switching elements 51U to 51W, 53U to 53W of the respective phases of the multi-phase converter 5 on the basis of a command (FC voltage command) from the controller for fuel cell 10 in the present embodiment.

Specifically, the output voltage value of the fuel cell stack 6 detected by the voltage sensor 62 and the output voltage value of the multi-phase converter 5 detected by the voltage sensor 65 are input to the DC/DC converter controller for fuel cell 4. The DC/DC converter controller for fuel cell 4 controls to switch each switching element 51U to 51W, 53U to 53W of the multi-phase converter 5 so that a voltage ratio (output voltage/input voltage) of the multi-phase converter 5 reaches a command value (FC voltage command value) from the controller for fuel cell 10.

The DC/DC converter controller for battery 7 is for controlling the DC/DC converter 8 for the battery 20 on the basis of a command from the controller for fuel cell 10. The DC/DC converter controller for the fuel cell 4 and the DC/DC converter controller for battery 7 respectively control the voltage ratio by the multi-phase converter 5 and the voltage ratio by the DC/DC converter 8 so that the input voltages to the drive inverter 3 are the same voltage (DC link voltage).

The output voltage value of the battery 20 detected by the voltage sensor 67 and the output voltage value of the DC/DC converter 8 detected by the voltage sensor 69 are input to the DC/DC converter controller for battery 7. The DC/DC converter controller for battery 7 controls to switch each switching element 82, 84 of the DC/DC converter 8 so that a voltage ratio (output voltage/input voltage) of the DC/DC converter 8 reaches a command value (DC link voltage command value) from the controller for fuel cell 10.

The impedance measuring device 200 is a device for measuring the impedance of the fuel cell stack 6. The impedance measuring device 200 measures the impedance of the fuel cell stack 6 by outputting alternating currents between a positive electrode and an intermediate point of the fuel cell stack 6 and between the intermediate point and a negative electrode of the fuel cell stack 6.

Figure 2:
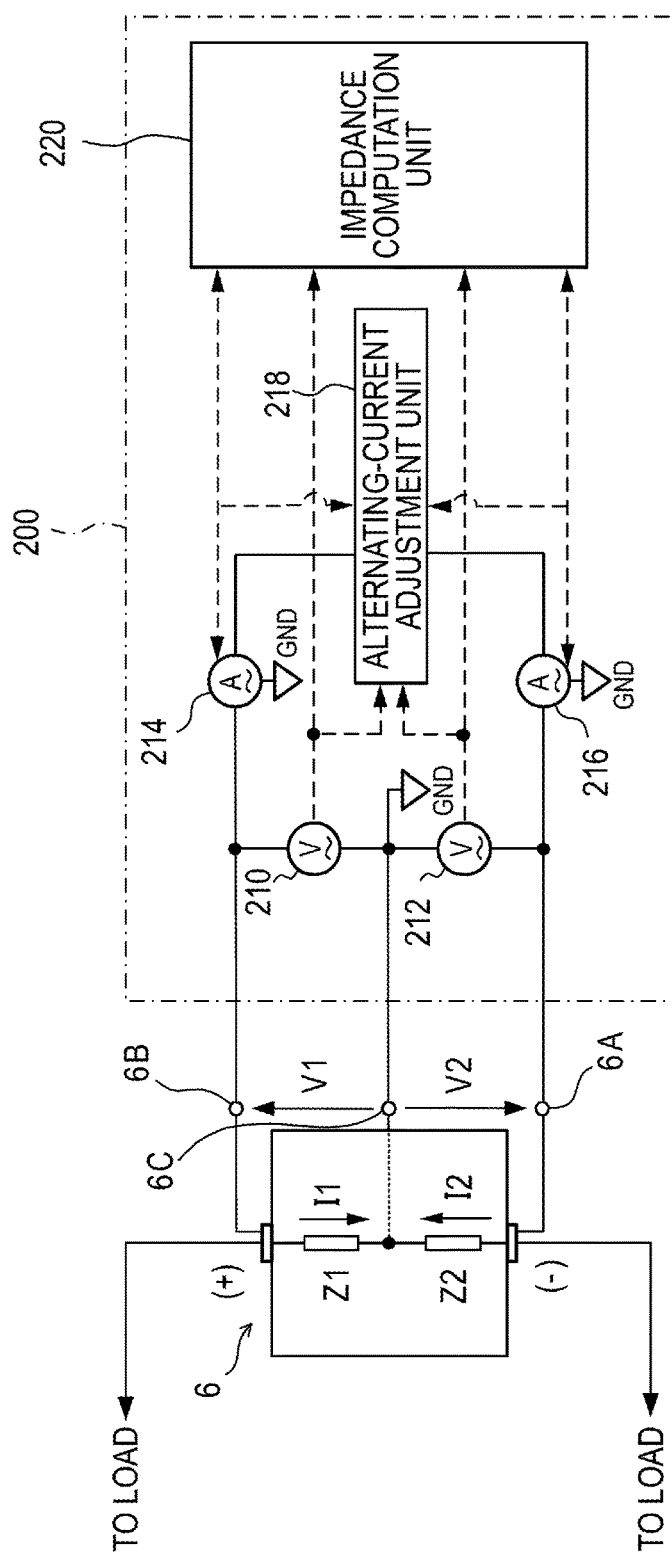
FIG. 2 is a circuit diagram showing an impedance measuring device for fuel cell stack shown in FIG. 1.

FIG. 2 is a circuit diagram of the impedance measuring device 200 for measuring the impedance of the fuel cell stack 6 shown in FIG. 1. It should be noted that, for the sake of graphical representation, the fuel cell stack 6 and the impedance measuring device 200 are so arranged that left and right sides of FIG. 2 are opposite to those of FIG. 1. Further, connection shown by solid lines means electrical connection and connection shown by broken lines (dashed lines) means connection of electrical signals.

This impedance measuring device 200 is connected to a positive electrode terminal (cathode electrode side terminal) 6B, a negative electrode terminal (anode electrode side terminal) 6A and an intermediate terminal 6C of the fuel cell stack 6. It should be noted that a part connected to the intermediate terminal 6C is grounded as shown.

As shown in FIG. 2, the impedance measuring device 200 includes a positive electrode side voltage sensor 210, a negative electrode side voltage sensor 212, a positive electrode side power supply unit 214, a negative electrode side power supply unit 216, an alternating-current adjustment unit 218 and an impedance computation unit 220.

The positive electrode side voltage sensor 210 is connected to the positive electrode terminal 6B and the intermediate terminal 6C, measures a positive electrode side alternating-current potential difference V1 of the positive electrode terminal 6B with respect to the intermediate terminal 6C and outputs that measurement result to the alternating-current adjustment unit 218 and the impedance computation unit 220. The negative electrode side voltage sensor 212 is connected to the negative electrode terminal 6A and the intermediate terminal 6C, measures a negative electrode side alternating-current potential difference V2 of the negative electrode terminal 6A with respect to the intermediate terminal 6C and outputs that measurement result to the alternating-current adjustment unit 218 and the impedance computation unit 220.

The positive electrode side power supply unit 214 is realized, for example, by a voltage-current conversion circuit by an unillustrated operational amplifier, and controlled by the alternating-current adjustment unit 218 so that an alternating current I1 flows into a closed circuit composed of the positive electrode terminal 6B and the intermediate terminal 6C. Further, the negative electrode side power supply unit 216 is realized, for example, by a voltage-current conversion circuit by an unillustrated operational amplifier (OP amplifier), and controlled by the alternating-current adjustment unit 218 so that an alternating current I2 flows into a closed circuit composed of the negative electrode terminal 6A and the intermediate terminal 6C.

The alternating-current adjustment unit 218 is realized, for example, by an unillustrated PI control circuit and generates command signals to the positive electrode side power supply unit 214 and the negative electrode side power supply unit 216 so that the alternating currents I1, I2 as described above flow to the respective closed circuits. By increasing and decreasing outputs of the positive electrode side power supply unit 214 and the negative electrode side power supply unit 216 according to the command signals generated in this way, the alternating-current potential differences V1 and V2 between the terminals are both controlled to a predetermined level (predetermined value). In this way, the alternating-current potential differences V1 and V2 become equal.

The impedance computation unit 220 includes hardware such as unillustrated AD converter and microcomputer, and a software configuration such as a program for calculating an impedance. The impedance computation unit 220 performs a process for impedance measurement by converting the alternating currents (I1,I2) and the alternating-current voltages (V1, V2) input from each unit 210, 212, 214, 216 into digital numerical signals by the AD converter.

Specifically, the impedance computation unit 220 calculates a first impedance Z1 from the intermediate terminal 6C to the positive electrode terminal 6B by dividing the positive electrode side alternating-current potential difference V1 by the alternating current I1. Further, the impedance computation unit 220 computes a second impedance Z2 from the intermediate terminal 6C to the negative electrode terminal 6A by dividing the negative electrode side alternating-current potential difference V2 by the alternating current I2. Furthermore, the impedance computation unit 220 computes an impedance Z of the fuel cell stack 6 by adding the first and second impedances Z1, Z2.

It should be noted that, in measuring the impedance of the fuel cell stack 6, the controller for fuel cell 10 first causes the multi-phase converter 5 to boost the output voltage of the fuel cell stack 6. This causes the impedance when the side of the fuel cell stack 6 is viewed from the drive inverter 3 to increase, and the impedance measurement is not adversely affected even if there is a load variation. Further, even if a voltage is higher on the output side of the multi-phase converter 5 than on the output side of the fuel cell stack 6, a current backflow to the fuel cell stack 6 is prevented by the diode 100 on the current bypass path BR.

In FIG. 2, the positive electrode terminal 6B and the negative electrode terminal 6A are shown to be directly connected to each output terminal of the fuel cell stack 6 for the sake of graphical representation. However, in the power conditioning system 1 of the present embodiment, the positive electrode terminal 6B and the negative electrode terminal 6A may be connected to a positive electrode terminal of the fuel cell on a most positive electrode side and a negative electrode terminal of the fuel cell on a most negative electrode side out of a plurality of fuel cells laminated in the fuel cell stack 6 without being limited to the above connection.

Further, in the present embodiment, the impedance computation unit 220 is configured to compute the impedance of the fuel cell stack 6 by the hardware such as the microcomputer executing the program stored in advance in an unillustrated memory. However, the configuration of the impedance computation unit 220 is not limited to this. For example, the impedance computation unit 220 may be realized by an analog computation circuit using an analog computation IC. By using the analog computation circuit, a temporally continuous impedance change can be output.

Here, alternating-current signals composed of sine wave signals are used as alternating currents and alternating-current voltages in the present embodiment. However, these alternating-current signals may be rectangular wave signals, triangular wave signals, sawtooth wave signals or the like without being limited to the sine wave signals.

Figure 3:
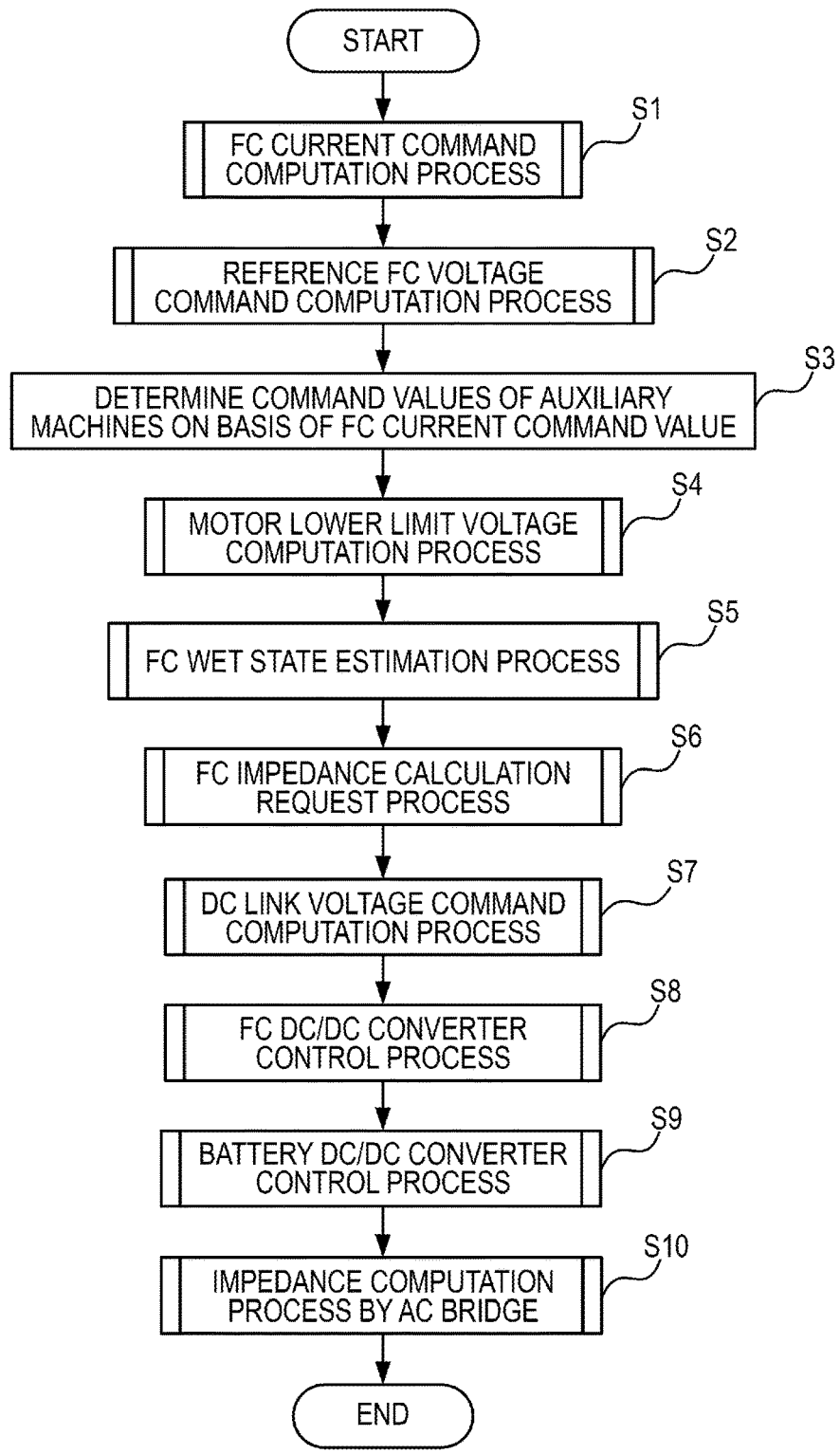
FIG. 3 is a flow chart showing an overall control of a controller for fuel cell, a DC/DC converter controller for fuel cell, a DC/DC converter controller for battery and the impedance measuring device in the embodiment of the present invention.

An overall operation of the power conditioning system 1 in the present embodiment is described with reference to a flow chart of FIG. 3. It should be noted that although the flow chart of FIG. 3 shows the overall operation of the power conditioning system 1 of the present embodiment, additional step(s) may be included if necessary. Further, a control method for the power conditioning system 1 of the present invention constitutes a part of the overall operation.

FIG. 3 is the flow chart (main process flow) showing the overall control of the controller for fuel cell 10, the DC/DC converter controller for fuel cell 4, the DC/DC converter controller for battery 7 and the impedance measuring device 200 of the power conditioning system 1 in the present embodiment.

A control relating to this flow chart is executed at least at timings at which an operating state of the drive motor 2 and operating states of the auxiliary machines 30 change. However, this control may be executed every predetermined time. Further, a sequence of steps may be changed within a range where no contradiction is caused.

First, the controller for fuel cell 10 performs an FC current command computation process for determining a current command value of the fuel cell stack 6 (Step S1) and performs a reference FC voltage command computation process for determining a voltage command value of the fuel cell stack 6 (Step S2).

Subsequently, the controller for fuel cell 10 determines various operation command values of the auxiliary machines 30 on the basis of the current command value (FC current command value to be described later) and voltage command value of the fuel cell stack 6 determined in Steps S1 and S2 (Step S3) and outputs the determined command values to each auxiliary machine.

Subsequently, the controller for fuel cell 10 performs a motor lower limit voltage computation process for determining a motor lower limit voltage of the drive motor 2 serving as an input voltage of the drive inverter 3 (Step S4).

Subsequently, the controller for fuel cell 10 performs an FC wet state estimation process for estimating the wet state of the fuel cell stack 6 to control an operating state of the fuel cell stack 6 (Step S5).

Subsequently, the controller for fuel cell 10 performs an FC impedance calculation request process for determining whether or not to calculate the impedance of the fuel cell stack 6 on the basis of the wet state of the fuel cell stack 6 specified by the FC wet state estimation process performed in Step S5 (Step S6).

Subsequently, the controller for fuel cell 10 performs a DC link voltage command process for specifying at which voltage value a DC link voltage should be set (Step S7). The controller for fuel cell 10 outputs an FC voltage command and a DC link voltage command respectively to the DC/DC converter controller for fuel cell 4 and the DC/DC converter controller for battery 7 on the basis of the DC link voltage specified in this way. It should be noted that the DC link voltage command is also output to the DC/DC converter controller for fuel cell 4 if necessary.

Subsequently, the DC/DC converter controller for fuel cell 4 performs an FC DC/DC converter computation process for increasing and decreasing the voltage of the multiphase converter 5 based on the output voltage (FC output voltage) of the fuel cell stack 6 and the DC link voltage command (Step S8).

Subsequently, the DC/DC converter controller for battery 7 performs a battery DC/DC converter control process for increasing and decreasing the voltage of the DC/DC converter 8 on the basis of the DC link voltage command input from the controller for fuel cell 10 (Step S9).

Subsequently, the impedance measuring device 200 performs an FC impedance computation process by an AC bridge method for computing (calculating) an internal impedance of the fuel cell stack 6 on the basis of an FC impedance calculation request command from the controller for fuel cell 10 (Step S10).

Then, the controller for fuel cell 10, the DC/DC converter controller for fuel cell 4, the DC/DC converter controller for battery 7 and the impedance measuring device 200 finish the overall control flow in the present embodiment shown in FIG. 3.

Next, each subroutine of FIG. 3 is described with reference to a flow chart.

Figure 4:
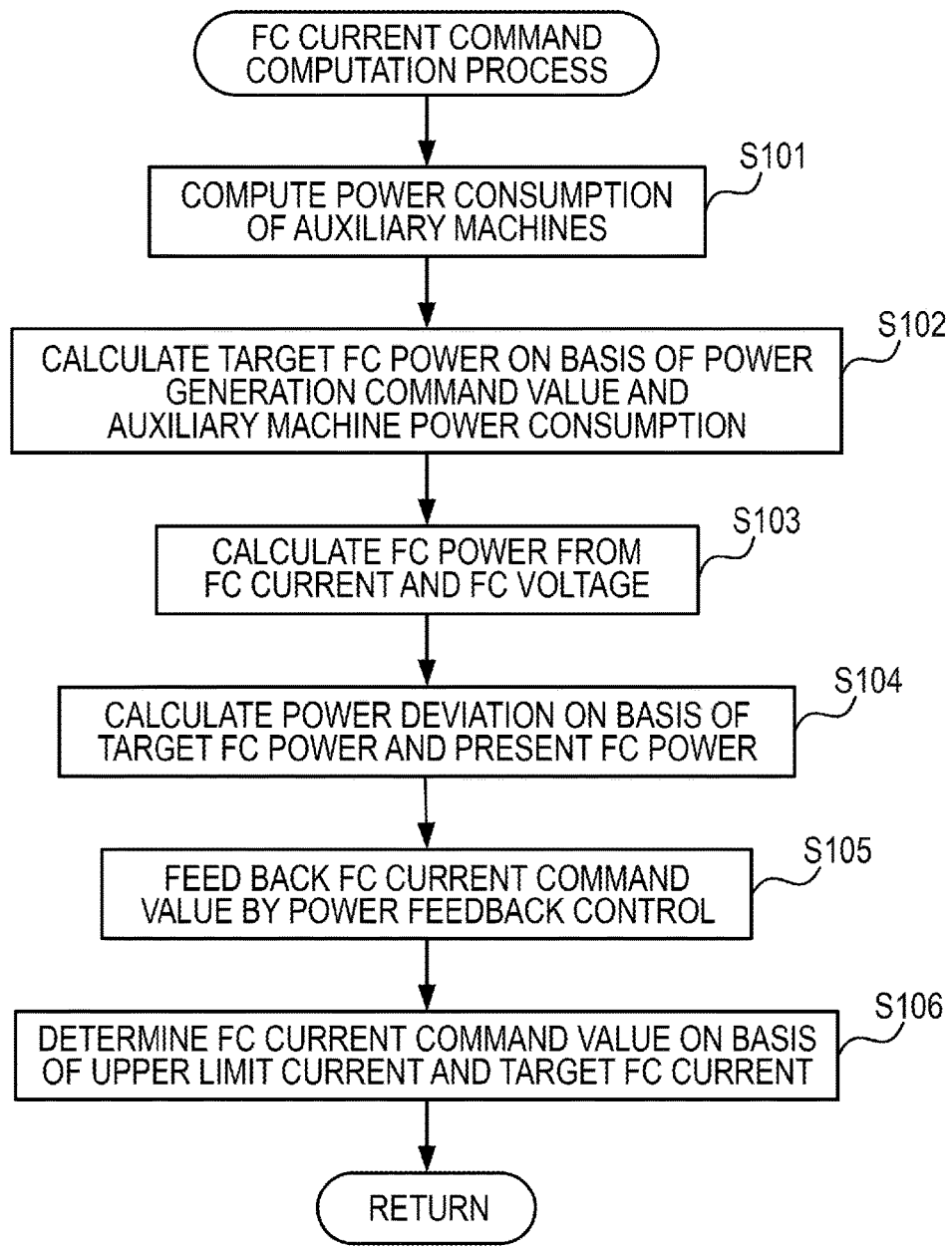
FIG. 4 is a flow chart showing an FC current command computation process performed by the controller for fuel cell.

FIG. 4 is a flow chart showing the FC current command computation process that is a subroutine corresponding to Step S1 of FIG. 3 and performed by the controller for fuel cell 10.

In this FC current command computation process, the controller for fuel cell 10 first computes power to be consumed in each auxiliary machine 30 (Step S101). Then, the controller for fuel cell 10 calculates target fuel cell power on the basis of power generation command values to the battery 20 and the fuel cell stack 6 and the power consumption of the auxiliary machines 30 computed in Step S101 (Step S102).

It should be noted that the power generation command value to the fuel cell stack 6 indicates how much power needs to be generated by the fuel cell stack 6. The controller for fuel cell 10 determines this power generation command value on the basis of a depressed amount of an accelerator pedal by a driver in the vehicle of the present embodiment, i.e. an accelerator pedal opening, a driving state of the drive motor 2 and the like.

Subsequently, the controller for fuel cell 10 calculates the present output power of the fuel cell stack 6 on the basis of the output current value of the fuel cell stack 6 detected by the current sensor 61 and the output voltage value of the fuel cell stack 6 detected by the voltage sensor 62 (Step S103). It should be noted that this output power of the fuel cell stack 6 is obtained by multiplying the output current value and output voltage value of the fuel cell stack 6.

Subsequently, the controller for fuel cell 10 calculates a power deviation of the fuel cell stack 6 on the basis of the target fuel cell power of the fuel cell stack 6 calculated in Step S102 and the actual output power of the fuel cell stack 6 calculated in Step S103 (Step S104). This power deviation is obtained on the basis of a difference between the target fuel cell power and the actual output power.

Subsequently, the controller for fuel cell 10 executes a power feedback control based on a PI control on the basis of the power deviation of the fuel cell stack 6 calculated in Step S104. The controller for fuel cell 10 corrects the current command value (target fuel cell current value) of the fuel cell stack 6 by this power feedback control (Step S105).

Subsequently, the controller for fuel cell 10 determines an FC current command value, which is a current command value to the fuel cell stack 6, on the basis of an upper limit current value of the fuel cell stack 6 set in advance in the controller for fuel cell 10 and the target fuel cell current value obtained in Step S105 (Step S106).

Specifically, the controller for fuel cell 10 compares the upper limit current value of the fuel cell stack 6 and the target fuel cell current command value and determines the smaller one as the FC current command value. Then, the controller for fuel cell 10 finishes this FC current command computation process and returns to the main process flow after determining the FC current command value.

It should be noted that the upper limit current value of the fuel cell stack 6 means an upper limit value of the current value that can be output by the fuel cell stack 6, and obtained in advance through an experiment or the like if necessary.

The controller for fuel cell 10 controls flow rates, pressures and the like of the anode gas and the cathode gas on the basis of the FC current command value determined in Step S106 so that the output current of the fuel cell stack 6 reaches this FC current command value. This is because the flow rates and the like of the anode gas and the cathode gas are controlled to control the output of the fuel cell stack 6, but the flow rates and the like of these gases are controlled on the basis of the output current of the fuel cell stack 6.

Figure 5:
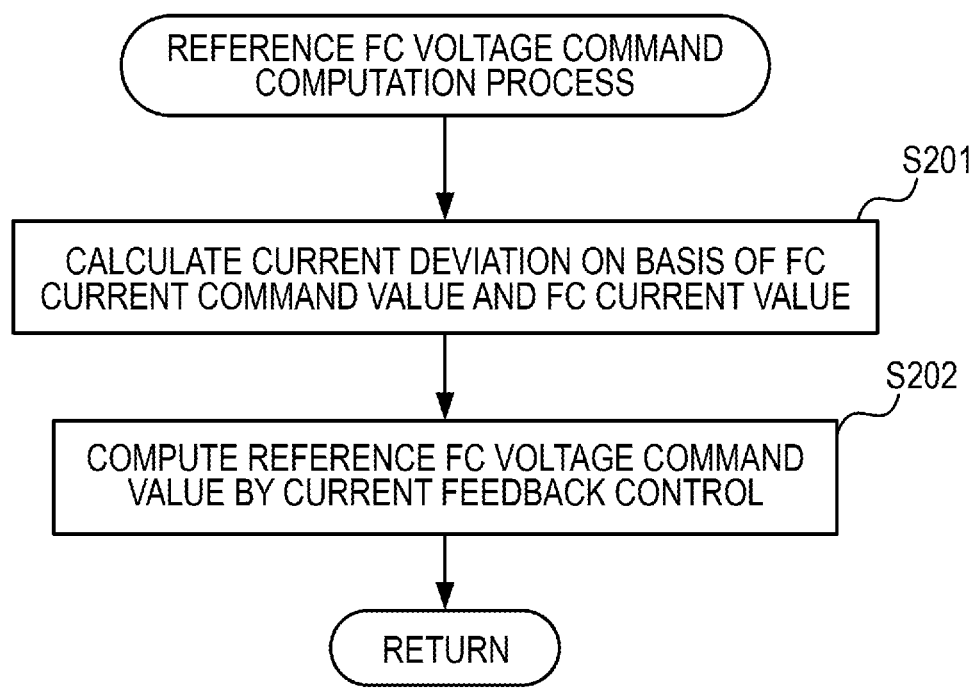
FIG. 5 is a flow chart showing a reference FC voltage command computation process performed by the controller for fuel cell.

FIG. 5 is a flow chart showing the reference FC voltage command computation process that is a subroutine corresponding to Step S2 of FIG. 3 and performed by the controller for fuel cell 10.

In this reference FC voltage command computation process, the controller for fuel cell 10 calculates a current deviation on the basis of the FC current command value determined in Step S106 of the FC current command computation process and the output current value of the fuel cell stack 6 detected by the current sensor 61 (Step S201). This current deviation is obtained based on a difference between the FC current command value of the fuel cell stack 6 and an actual current command value.

Subsequently, the controller for fuel cell 10 executes a current feedback control based on the PI control on the basis of the current deviation calculated in Step S201. As the output current of the fuel cell stack 6 is changed by this current feedback control, the controller for fuel cell 10 computes a reference FC voltage command value serving as a target voltage value of the fuel cell stack 6 on the basis of an IV characteristic curve stored in advance in the unillustrated memory (Step S202). Then, the controller for fuel cell 10 finishes this reference FC voltage command computation process and returns to the main process flow.

It should be noted that the controller for fuel cell 10 may be configured to control the flow rates and pressures of the anode gas and the cathode gas and the like on the basis of the reference FC voltage command value determined in Step S202 so that the output voltage value of the fuel cell stack 6 reaches this reference FC voltage command value instead of controlling such that the output current of the fuel cell stack 6 reaches the FC current command value.

Figure 6:
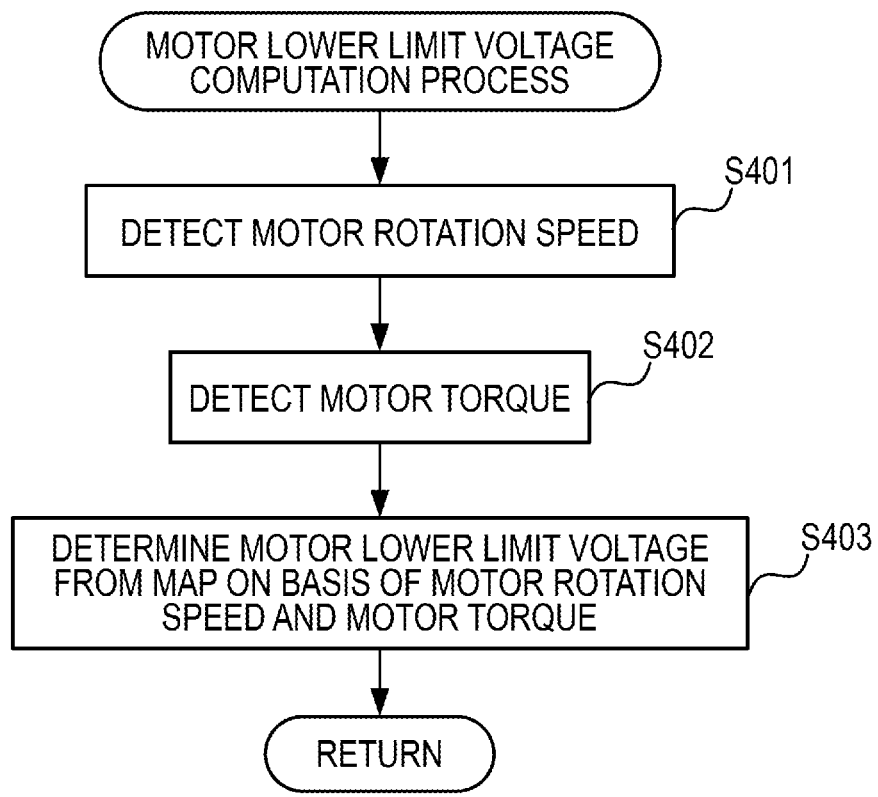
FIG. 6 is a flow chart showing a motor lower limit voltage computation process performed by the controller for fuel cell.

FIG. 6 is a flow chart showing the motor lower limit voltage computation process that is a subroutine corresponding to Step S4 of FIG. 3 and performed by the controller for fuel cell 10.

In this motor lower limit voltage computation process, the controller for fuel cell 10 first detects the motor rotation speed of the drive motor 2 by the motor rotation speed detection unit 21 (Step S401) and detects the motor torque of the drive motor 2 by the motor torque detection unit 22 (Step S402).

It should be noted that an induced voltage is generated in the drive motor 2 as the motor rotation speed of the drive motor 2 increases. Thus, if the supply voltage to the drive motor 2, i.e. the output voltage of the drive inverter 3, is higher than the induced voltage, the drive motor 2 cannot be driven. Thus, in this motor lower limit voltage computation process, the motor rotation speed of the drive motor 2 is first detected.

Further, although not shown, a current sensor for detecting a supply current actually input to the drive motor 2 is provided to detect the motor torque of the drive motor 2 and the efficiency thereof. The controller for fuel cell 10 may detect the motor torque of the drive motor 2 on the basis of the detected supply current value.

Subsequently, the controller for fuel cell 10 refers to a motor rotation speed-motor torque map stored in advance in the unillustrated memory of the controller for fuel cell 10 and determines a motor lower limit voltage on the basis of the motor rotation speed and motor torque of the drive motor 2 detected in Steps S401, S402 (Step S403).

It should be noted that although the motor rotation speed-motor torque map is not shown, map data may be, for example, obtained in advance from experimental data and stored in the memory of the controller for fuel cell 10.

Then, the controller for fuel cell 10 finishes this motor lower limit voltage computation process and returns to the main process flow after determining the motor lower limit voltage in this way.

Figure 7:
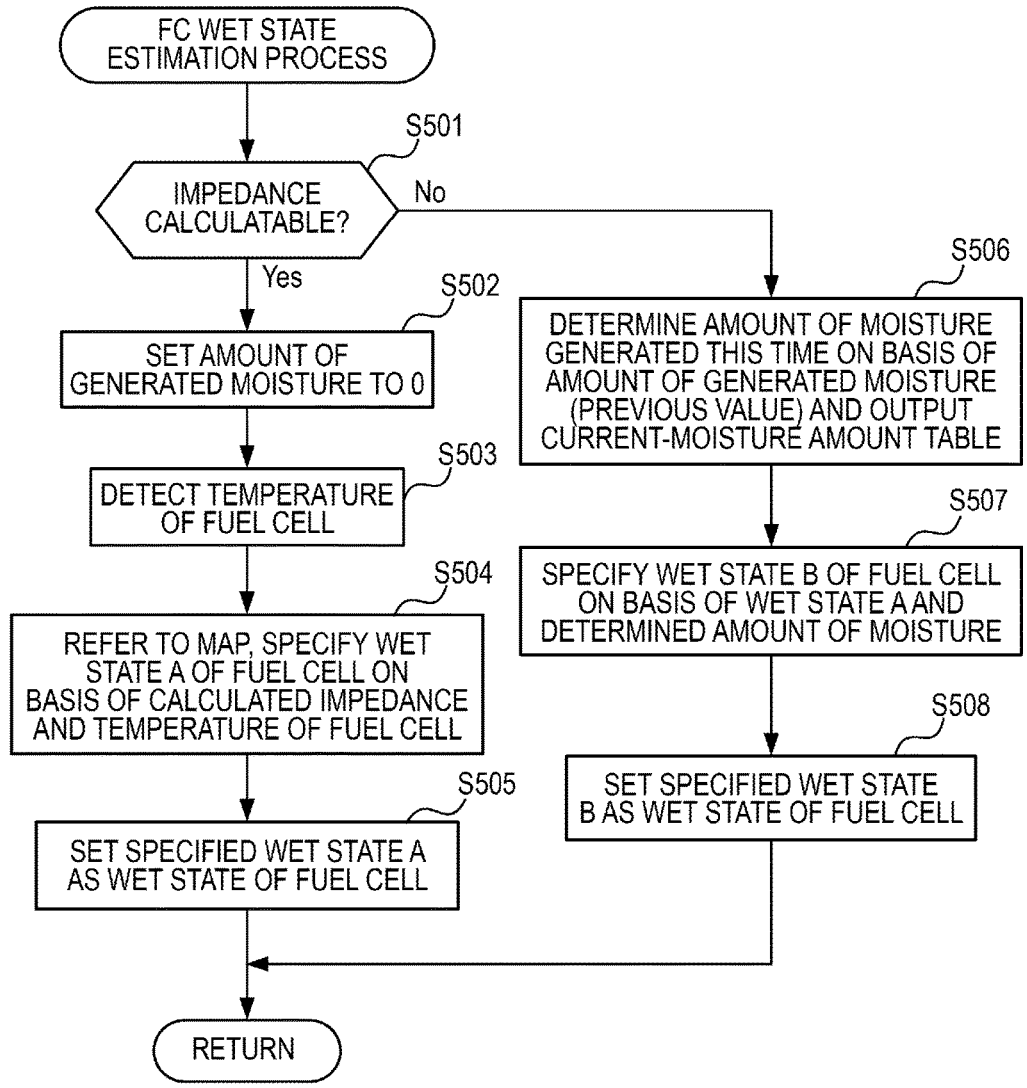
FIG. 7 is a flow chart showing an FC wet state estimation process performed by the DC/DC converter controller for fuel cell.

FIG. 7 is a flow chart showing the FC wet state estimation process that is a subroutine corresponding to Step S5 of FIG. 3 and performed by the controller for fuel cell 10.

In this FC wet state estimation process, the controller for fuel cell 10 first determines whether or not the impedance of the fuel cell stack 6 can be calculated on the basis of the output current value of the fuel cell stack 6 detected by the current sensor 61 and the output voltage value of the fuel cell stack 6 detected by the voltage sensor 62 (Step S501).

For example, if the fuel cell stack 6 is in a transient operating state so as to receive the FC current command value and the FC voltage command value from the controller for fuel cell 10 and reach each command value, the controller for fuel cell 10 may determine such that the impedance of the fuel cell stack 6 cannot be calculated.

Further, the controller for fuel cell 10 may determine such that the impedance of the fuel cell stack 6 cannot be calculated also when a circuit of the impedance measuring device 200 is saturated due to the generation of a large ripple current or the like.

If it is determined in Step S501 that the impedance of the fuel cell stack 6 can be calculated, the controller for fuel cell 10 resets the amount of moisture generated from the fuel cell stack 6 (Step S502). Specifically, the controller for fuel cell 10 sets the amount of moisture generated from the fuel cell stack 6 to 0.

Subsequently, the controller for fuel cell 10 detects a temperature of the fuel cell stack 6 by an unillustrated temperature sensor (Step S503).

Subsequently, the controller for fuel cell 10 receives the impedance of the fuel cell stack 6 measured/computed by the impedance measuring device 200 from the impedance measuring device 200. It should be noted that the controller for fuel cell 10 may store the impedance of the fuel cell stack 6 measured last time by the impedance measuring device 200 in the memory and read the stored impedance.

Specifically, the impedance measuring device 200 calculates the impedance of the fuel cell stack 6 on the basis of the alternating current adjusted by the alternating current adjustment unit 218 and the alternating-current voltage values detected by the positive electrode side voltage sensor 210 and the negative electrode side voltage sensor 212. Then, the controller for fuel cell 10 refers to an impedance-fuel cell temperature map stored in advance in the unillustrated memory and the like, and specifies a wet state A of the fuel cell stack 6 on the basis of the impedance of the fuel cell stack 6 received (read) in this way and the temperature of the fuel cell stack 6 detected in Step S503 (Step S504).

It should be noted that although the impedance-fuel cell temperature map is not shown, map data may be, for example, obtained in advance from experimental data and the like, and stored in the memory.

Subsequently, the controller for fuel cell 10 sets the wet state A of the fuel cell stack 6 specified as described above as a wet state of the fuel cell stack 6 (Step S505), finishes this FC wet state estimation process and returns to the main process flow.

On the other hand, if it is determined in Step S501 that the impedance of the fuel cell stack 6 cannot be calculated, the controller for fuel cell 10 determines the amount of moisture generated until now after the wet state A of the fuel cell stack 6 was specified last time (Step S506).

The amount of moisture generated from the fuel cell stack 6 and an integrated value of the output current of the fuel cell stack 6 have a predetermined relationship. Thus, the controller for fuel cell 10 refers to a fuel cell output current-moisture amount table stored in advance in the unillustrated memory and the like, and determines the amount of moisture generated this time.

Here, the fuel cell output current-moisture amount table is a table showing a relationship between the output current (integrated value) of the fuel cell stack 6 and the amount of moisture generated during a detection period. The output current of the fuel cell stack 6 is detected by the current sensor 61 and output to the controller for fuel cell 10. In the present embodiment, the controller for fuel cell 10 may integrate the output current value from the last impedance calculation and store the integrated value in the unillustrated memory. In this way, the controller for fuel cell 10 can specify how much moisture has been generated in the fuel cell stack 6 after the amount of moisture was set to 0 last time (Step S502) on the basis of this output current integrated value.

Subsequently, the controller for fuel cell 10 reads the wet state A of the fuel cell stack 6 set last time from the unillustrated memory and refers to a wet state-moisture amount map stored in advance in this memory or the like. Then, the controller for fuel cell 10 specifies (estimates) a wet state B of the fuel cell stack 6 on the basis of the read wet state A and the amount of moisture this time determined in Step S506 (Step S507).

Subsequently, the controller for fuel cell 10 sets the wet state B of the fuel cell stack 6 specified as described above as the wet state of the fuel cell stack 6 (Step S508), finishes this FC wet state estimation process and returns to the main process flow.

Figure 8:
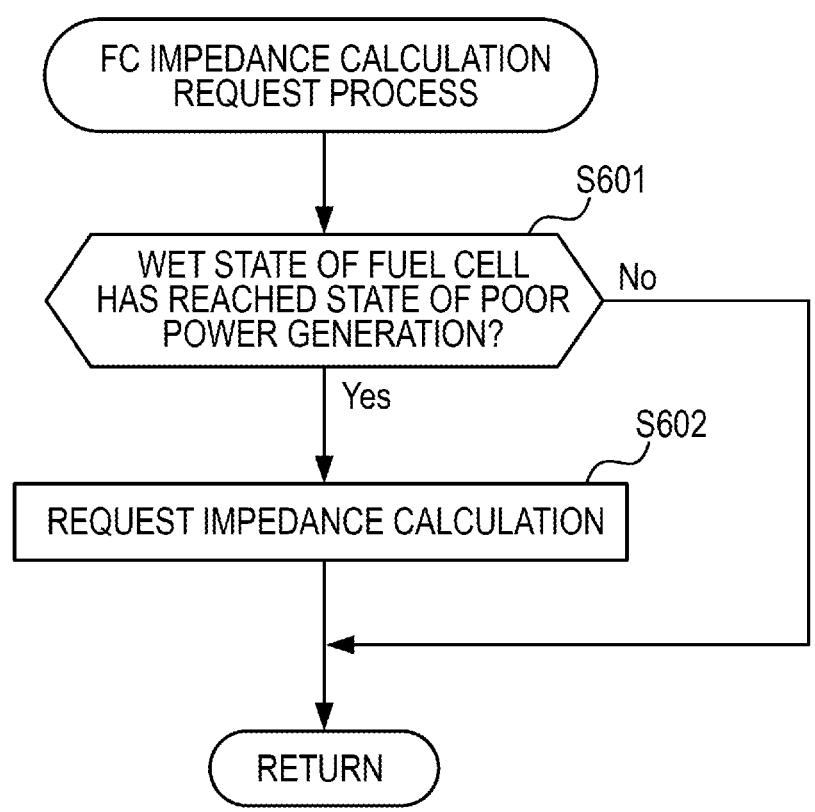
FIG. 8 is a flow chart showing an FC impedance calculation request process performed by the controller for fuel cell.

FIG. 8 is a flow chart showing the FC impedance calculation request process that is a subroutine corresponding to Step S6 of FIG. 3 and performed by the controller for fuel cell 10.

In this FC impedance calculation request process, the controller for fuel cell 10 first determines whether or not the fuel cell stack 6 has reached a state of poor power generation on the basis of the wet state A or B of the fuel cell stack 6 specified by the FC wet state estimation process (Step S601).

Specifically, if the fuel cell stack 6 is in an excessively dry state or if the fuel cell stack 6 is conversely in an excessively wet state on the basis of the wet state A or B of the fuel cell stack 6 set in the FC wet state estimation process, the controller for fuel cell 10 determines that the fuel cell stack 6 has reached the state of poor power generation. It should be noted that the state of poor power generation can also be called a state where the power generation efficiency of the fuel cell stack 6 has been reduced.

If it is determined in Step S601 that the fuel cell stack 6 has not reached the state of poor power generation, the controller for fuel cell 10 directly finishes this FC impedance calculation request process and returns to the main process flow. In this case, the controller for fuel cell 10 may estimate the wet state B of the fuel cell stack 6 by performing processings of Steps S506 to S508 of the FC wet state estimation process.

On the other hand, if it is determined in Step S601 that the fuel cell stack 6 has reached the state of poor power generation, the controller for fuel cell 10 requests the impedance measuring device 200 to calculate the impedance of the fuel cell stack 6. Specifically, the controller for fuel cell 10 outputs an impedance calculation request to the impedance measuring device 200 (Step S602), finishes this FC impedance calculation request process and returns to the main process flow.

Figure 9:
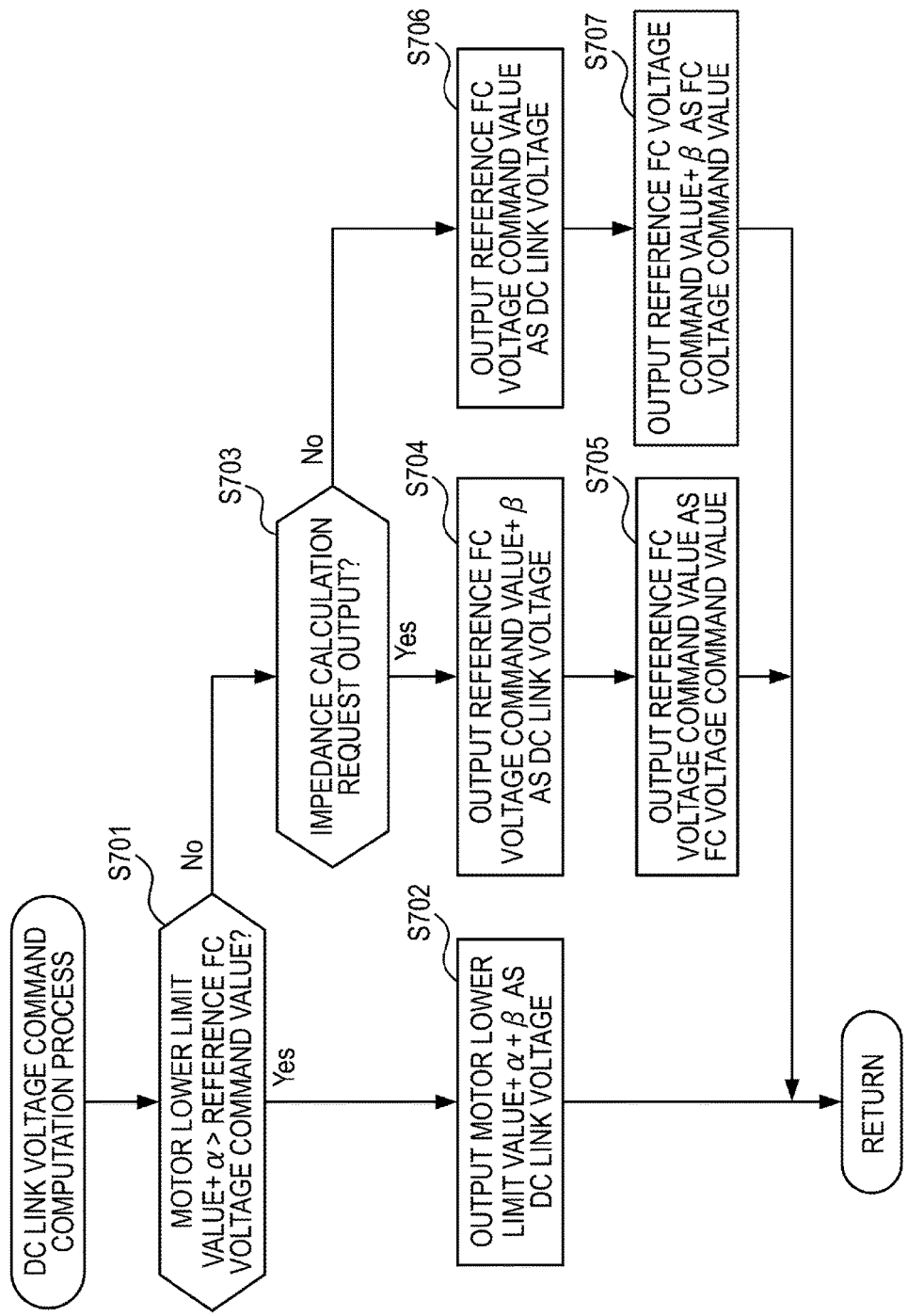
FIG. 9 is a flow chart showing a DC link voltage command computation process performed by the controller for fuel cell.

FIG. 9 is a flow chart showing the DC link voltage command computation process that is a subroutine corresponding to Step S7 of FIG. 3 and performed by the controller for fuel cell 10.

In this DC link voltage command computation process, the controller for fuel cell 10 compares a value obtained by adding a predetermined margin $\alpha$ to the motor lower limit voltage of the drive motor 2 determined by the motor lower limit voltage computation process and the reference FC voltage command value calculated by the reference FC voltage command computation process. Then, the controller for fuel cell 10 determines whether or not the motor lower limit voltage+margin $\alpha$ is larger than the reference FC voltage command value (Step S701).

If it is determined that the motor lower limit voltage+margin $\alpha$ is larger than the reference FC voltage command value, the controller for fuel cell 10 outputs a value obtained by further adding a margin $\beta$ to the motor lower limit voltage+margin $\alpha$ as the DC link voltage to the DC/DC converter controller for battery 7 (Step S702). Then, the controller for fuel cell 10 finishes this DC link voltage command computation process and returns to the main process flow.

On the other hand, if it is determined that the motor lower limit voltage+margin α is not larger than the reference FC voltage command value, the controller for fuel cell 10 determines whether or not an impedance calculation request has been output to the impedance measuring device 200 in the FC impedance calculation request process (Step S703).

If it is determined that the impedance calculation request has been output, the controller for fuel cell 10 outputs the reference FC voltage command value+margin β as the DC link voltage to the DC/DC converter controller for battery 7 (Step S704).

Subsequently, the controller for fuel cell 10 outputs the reference FC voltage command value as an FC voltage command value to the DC/DC converter controller for fuel cell 4 (Step S705), finishes this DC link voltage command computation process and returns to the main process flow.

On the other hand, if it is determined in Step S703 that no impedance calculation request has been output, the controller for fuel cell 10 outputs the reference FC voltage command value as the DC link voltage to the DC/DC converter controller for battery 7 (Step S706).

Subsequently, the controller for fuel cell 10 outputs the reference FC voltage command value+margin β as the FC voltage command value to the DC/DC converter controller for fuel cell 4 (Step S707), finishes this DC link voltage command computation process and returns to the main process flow.

Here, each margin α, β is briefly described. The margin α in the determination of Step S701 and in the output value of Step S702 means a margin for the motor lower limit voltage computed in Step S403 of the motor lower limit voltage computation process.

This margin α is for preventing (motor lower limit voltage)>(DC link voltage) as a lower limit value capable of measuring the impedance of the fuel cell stack 6. Specifically, this margin α is determined through an experiment or the like in consideration of a detection error of the DC link voltage, amplitudes of ripple voltage components generated by the switching operation of each switching element 82, 84 of the DC/DC converter 8 and the like. By considering positive components and negative components of the detection error and voltage amplitudes and adding all of these, the margin α may be determined.

It should be noted that the motor lower limit voltage is set by adding an induced voltage generated by the rotation of the drive motor 2 so as to satisfy a torque request of the drive motor 2.

The margin β in the output values of Steps S702, S704 and S707 means a margin for the DC link voltage command value and the FC voltage command value output by the controller for fuel cell 10. This margin β is for setting the DC link voltage command value and the FC voltage command value according to the presence or absence of the output of the impedance calculation request.

If no impedance calculation request has been output, the output voltage of the fuel cell stack 6 is directly connected to the output voltage of the DC/DC converter 8 for the battery 20 without boosting by the multi-phase converter 5, placing top priority on the efficiency of the fuel cell stack 6.

On the other hand, upon entering a state where (output voltage of the fuel cell stack 6)>(DC link voltage), the fuel cell stack 6 is affected by a load variation of the drive motor 2 serving as the load and the impedance measuring device 200 cannot accurately measure the impedance of the fuel cell stack 6. Thus, if the impedance calculation request has been output, the DC link voltage is set to be higher than the output voltage of the fuel cell stack 6.

Specifically, this margin β is determined through an experiment or the like in consideration of a detection error between the output voltage of the fuel cell stack 6 or the multi-phase converter 5 and the DC link voltage, amplitudes of ripple voltage components generated by the switching operation of each switching element 51U to 51W, 53U to 53W of the multi-phase converter 5 and each switching element 82, 84 of the DC/DC converter 8, voltage falling caused by the flow of a current into the multi-phase converter 5 and the like. By considering positive components and negative components of the detection error and voltage amplitudes and adding all of these, the margin β may be determined.

It should be noted that, as is understood from the determination of Step S701, this DC link voltage command value is a value higher than the motor lower limit voltage+α regardless of the presence or absence of the output of the impedance calculation request.

Figure 10:
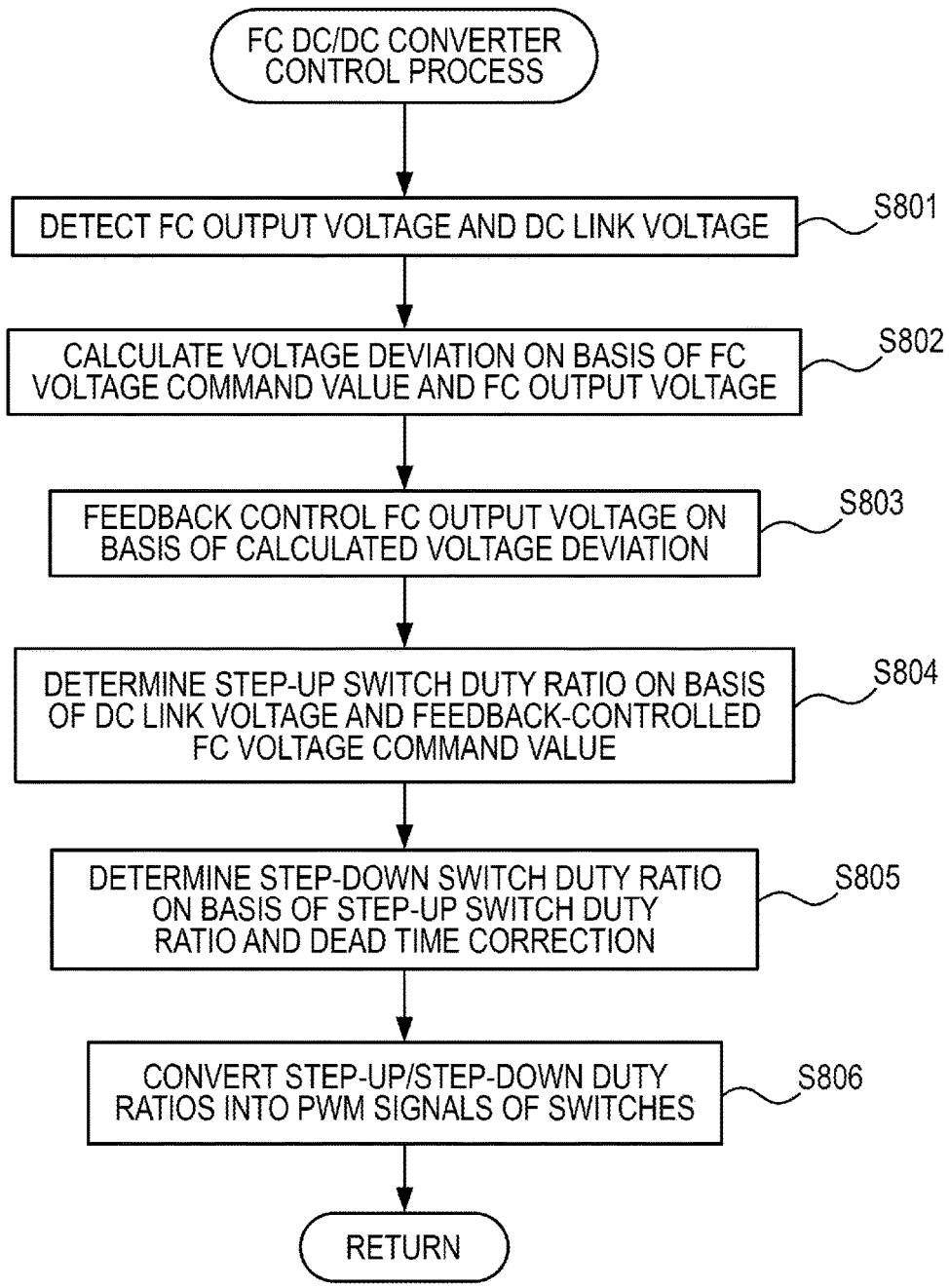
FIG. 10 is a flow chart showing an FC DC/DC converter control process performed by the DC/DC converter controller for fuel cell.

FIG. 10 is a flow chart showing the FC DC/DC converter control process that is a subroutine corresponding to Step S8 of FIG. 3 and performed by the DC/DC converter controller for fuel cell 4.

In this FC DC/DC converter control process, the DC/DC converter controller for fuel cell 4 detects the output voltage of the fuel cell stack 6 and the output voltage of the multi-phase converter 5, i.e. the DC link voltage, by the voltage sensors 62, 65 (Step S801).

Then, the DC/DC converter controller for fuel cell 4 calculates a voltage deviation of the output voltage of the fuel cell stack 6 on the basis of the FC voltage command value input from the controller for fuel cell 10 and the detected output voltage value of the fuel cell stack 6 (Step S802). This voltage deviation is obtained based on a difference between the FC voltage command value and the detected output voltage value of the fuel cell stack 6.

Subsequently, the DC/DC converter controller for fuel cell 4 executes a voltage feedback control based on the PI control for the output voltage of the fuel cell stack 6 (i.e. input/output voltage ratio of the multi-phase converter 5) on the basis of the voltage deviation of the fuel cell stack 6 calculated in Step S802 (Step S803).

Subsequently, the DC/DC converter controller for fuel cell 4 determines a duty ratio of a step-up switch (lower stage) on the basis of the DC link voltage and the feedback controlled FC voltage command value (Step S804) and determines a duty ratio of a step-down switch (upper stage) on the basis of the duty ratio of the step-up switch (lower stage) determined in this way and a dead time correction (Step S805).

Subsequently, the DC/DC converter controller for fuel cell 4 converts the step-up duty ratio and step-down duty ratio determined in Step S804, S805 into PWM signals to be output to each switching element 51U to 51W, 53U to 53W or generates the PWM signals from the step-up duty ratio and step-down duty ratio (Step S806). Then, the DC/DC converter controller for fuel cell 4 outputs these PWM signals to the corresponding switching elements 51U to 51W, 53U to 53W, finishes this FC DC/DC converter control process and returns to the main process flow.

Figure 11:
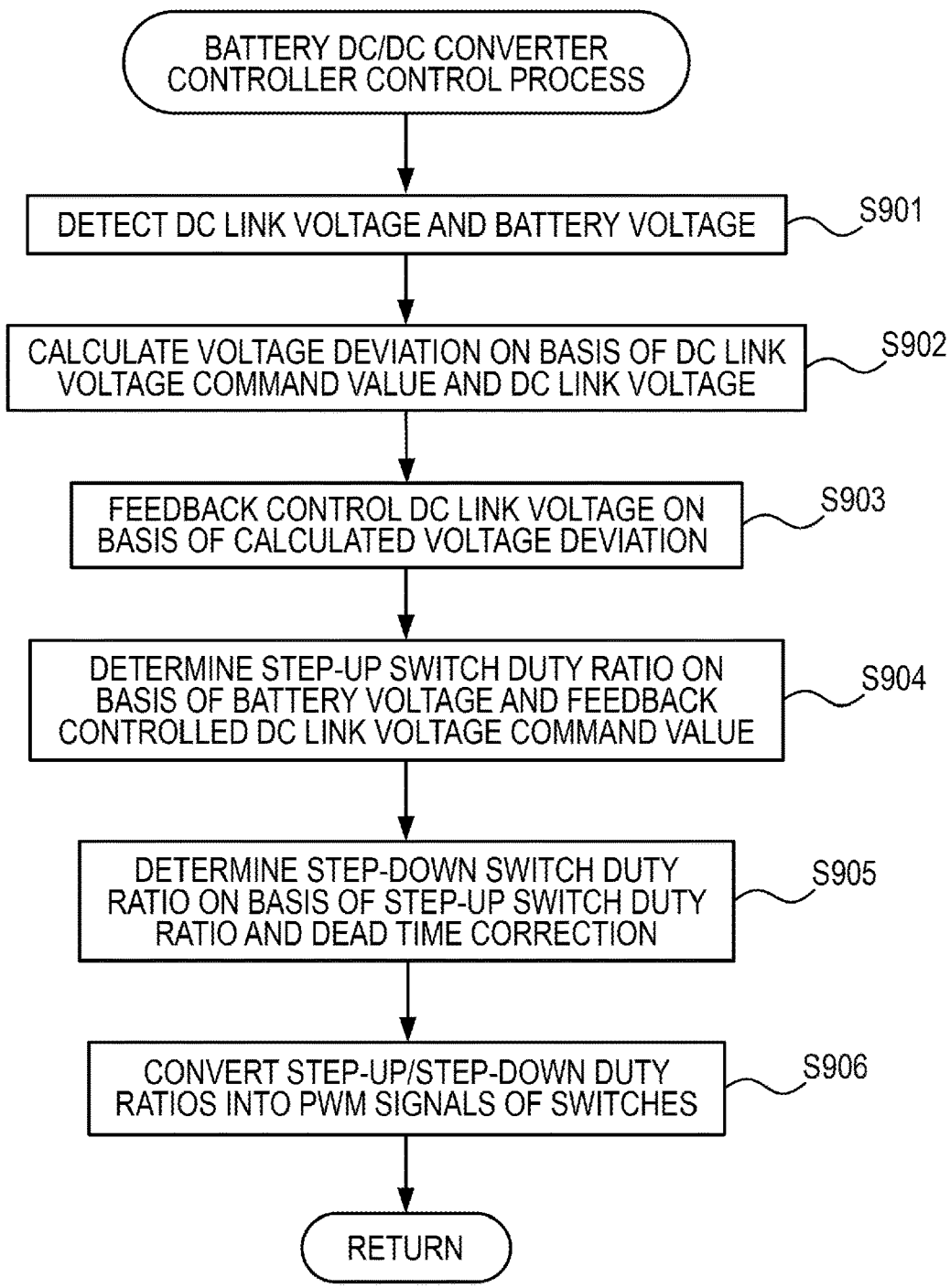
FIG. 11 is a flow chart showing a battery DC/DC converter control process performed by the DC/DC converter controller for battery.

FIG. 11 is a flow chart showing the battery DC/DC converter control process that is a subroutine corresponding to Step S9 of FIG. 3 and performed by the DC/DC converter controller for battery 7.

In this battery DC/DC converter control process, the DC/DC converter controller for battery 7 first detects the output voltage of the DC/DC converter 8, i.e. DC link voltage, and the output voltage of the battery 20 by the voltage sensors 67, 69 (Step S901).

Then, the DC/DC converter controller for battery 7 calculates a voltage deviation of the DC link voltage on the basis of the DC link voltage command value and the detected DC link voltage value (S902). This voltage deviation is obtained based on a difference between the DC link voltage command value and the detected DC link voltage value.

Subsequently, the DC/DC converter controller for battery 7 executes a voltage feedback control based on the PI control for the DC link voltage (i.e. input/output voltage ratio of the DC/DC converter 8) on the basis of the voltage deviation of the DC link voltage calculated in Step S902 (Step S903).

Subsequently, the DC/DC converter controller for battery 7 determines a duty ratio of a step-up switch (lower stage) on the basis of the output voltage of the battery 20 and the feedback-controlled DC link voltage command value (Step S904) and determines a duty ratio of a step-down switch (upper stage) on the basis of the duty ratio of the step-up switch (lower stage) determined in this way and a dead time correction (Step S905).

Subsequently, the DC/DC converter controller for battery 7 converts the step-up duty ratio and step-down duty ratio determined in Steps S904, S905 into PWM signals to be output to each switching element 82, 84 or generates the PWM signals from the step-up duty ratio and step-down duty ratio (Step S906). Then, the DC/DC converter controller for battery 7 outputs these PWM signals to the corresponding switching elements 82, 84, finishes this battery DC/DC converter control process and returns to the main process flow.

Figure 12:
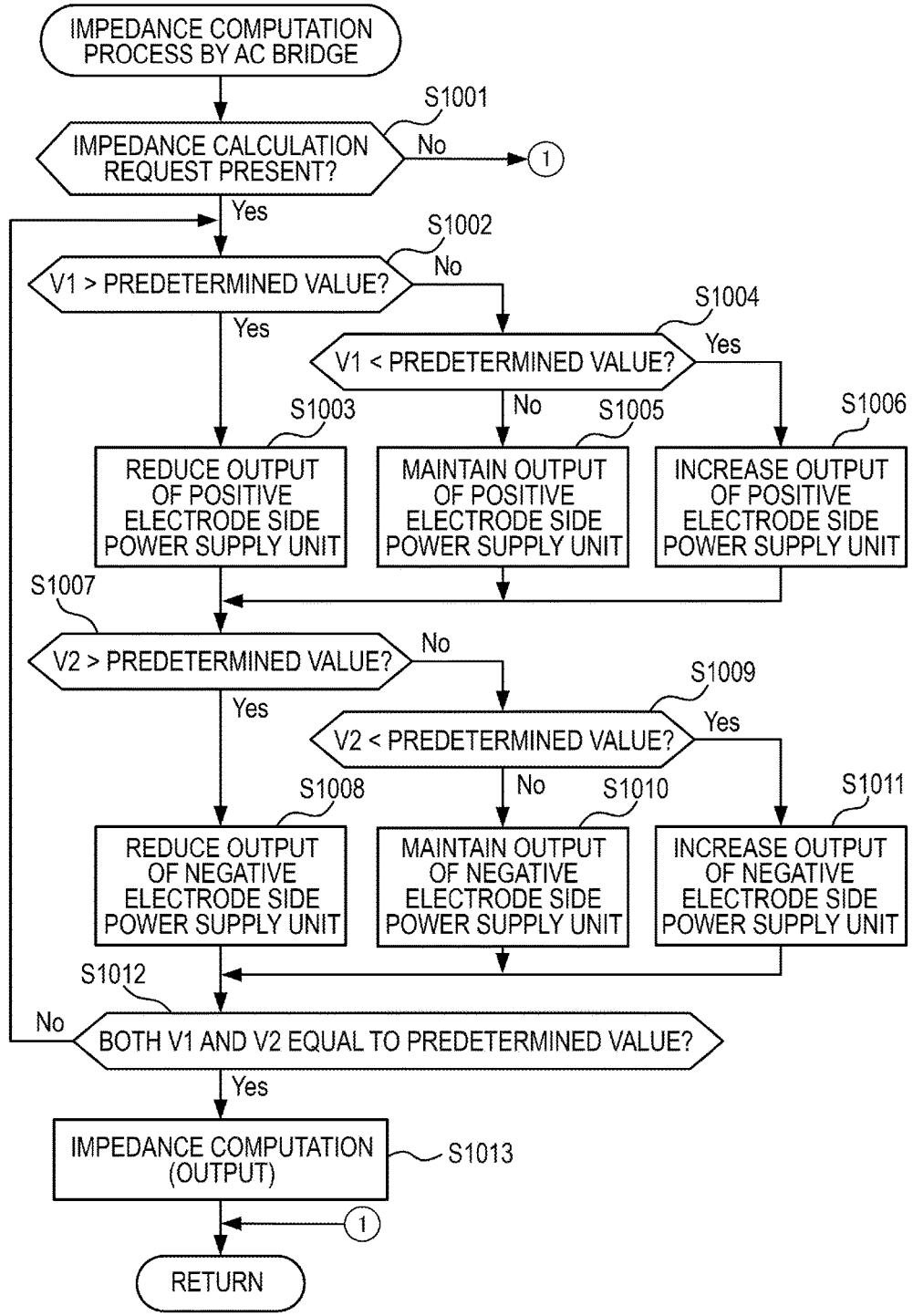
FIG. 12 is a flow chart showing an impedance computation process by an AC bridge performed by the impedance measuring device.

FIG. 12 is a flow chart showing the impedance computation process by the AC bridge (AC bridge method) that is a subroutine corresponding to Step S10 of FIG. 3 and performed by the impedance computation unit 220 of the impedance measuring device 200.

In this impedance computation process by the AC bridge, the impedance computation unit 220 of the impedance measuring device 200 first determines whether or not the controller for fuel cell 10 has output the impedance calculation request in Step S6 of the main process flow (Step S1001). If it is determined that the controller for fuel cell 10 has output no impedance calculation request, the impedance computation unit 220 finishes this impedance computation process by the AC bridge and returns to the main process flow.

On the other hand, if it is determined that the controller for fuel cell 10 has output the impedance calculation request, the impedance computation unit 220 determines whether or not the positive electrode side alternating-current potential difference V1 is larger than a predetermined value (Step S1002).

If it is determined that the positive electrode side alternating-current potential difference V1 is larger than the predetermined value, the impedance computation unit 220 controls the positive electrode side power supply unit 214 to reduce the output of the positive electrode side power supply unit 214 by a predetermined voltage (Step S1003). In this way, the positive electrode side alternating-current potential difference V1 detected by the positive electrode side voltage sensor 210 decreases.

On the other hand, if it is determined in Step S1002 that the positive electrode side alternating-current potential difference V1 is equal to or smaller than the predetermined value, the impedance computation unit 220 determines whether or not the positive electrode side alternating-current potential difference V1 is smaller than a predetermined value (Step S1004). If the positive electrode side alternating-current potential difference V1 is smaller than the predetermined value, the impedance computation unit 220 controls the positive electrode side power supply unit 214 to increase the output of the positive electrode side power supply unit 214 by a predetermined voltage (Step S1006). In this way, the positive electrode side alternating-current potential difference V1 detected by the positive electrode side voltage sensor 210 increases.

Further, if it is determined that the positive electrode side alternating-current potential difference V1 is equal to the predetermined value, the impedance computation unit 220 controls the positive electrode side power supply unit 214 to maintain the output of the positive electrode side power supply unit 214 (Step S1005). In this way, the positive electrode side alternating-current potential difference V1 detected by the positive electrode side voltage sensor 210 is maintained.

Subsequently, the impedance computation unit 220 determines whether or not the negative electrode side alternating-current potential difference V2 is larger than the predetermined value (Step S1007). If it is determined that the negative electrode side alternating-current potential difference V2 is larger than the predetermined value, the impedance computation unit 220 controls the negative electrode side power supply unit 216 to reduce the output of the negative electrode side power supply unit 216 by a predetermined voltage (Step S1008). In this way, the negative electrode side alternating-current potential difference V2 detected by the negative electrode side voltage sensor 212 decreases.

On the other hand, if it is determined in Step S1007 that the negative electrode side alternating-current potential difference V2 is equal to or smaller than the predetermined value, the impedance computation unit 220 determines whether or not the negative electrode side alternating-current potential difference V2 is smaller than the predetermined value (Step S1009). If it is determined that the negative electrode side alternating-current potential difference V2 is smaller than the predetermined value, the impedance computation unit 220 controls the negative electrode side power supply unit 216 to increase the output of the negative electrode side power supply unit 216 by a predetermined voltage (Step S1011). In this way, the negative electrode side alternating-current potential difference V2 detected by the negative electrode side voltage sensor 212 increases.

Further, if it is determined that the negative electrode side alternating-current potential difference V2 is equal to the predetermined value, the impedance computation unit 220 controls the negative electrode side power supply unit 216 to maintain the output of the negative electrode side power supply unit 216 (Step S1010). In this way, the negative electrode side alternating-current potential difference V2 detected by the negative electrode side voltage sensor 212 is maintained.

Subsequently, the impedance computation unit 220 determines whether or not the positive electrode side alternating-current potential difference V1 and the negative electrode side alternating-current potential difference V2 are equal to the predetermined value (Step S1012). If it is determined that at least one of the positive electrode side alternating-current potential difference V1 and the negative electrode side alternating-current potential difference V2 is not equal to the predetermined value, the impedance computation unit 220 returns to Step S1002 and repeats the processings thus far.

On the other hand, if it is determined that the positive electrode side alternating-current potential difference V1 and the negative electrode side alternating-current potential difference V2 are equal to the predetermined value, the impedance computation unit 220 computes a positive electrode side impedance Z1 (=V1/I1) and a negative electrode side impedance Z2 (=V2/I2) on the basis of each alternating-current potential difference V1, V2 and each alternating-current value I1, I2, and computes an impedance Z (=Z1+Z2) by adding these impedances (Step S1013).

Then, the impedance computation unit 220 outputs the computed impedance Z of the fuel cell stack 6 to the controller for fuel cell 10, finishes this impedance computation process by the AC bridge and returns to the main process flow. It should be noted that the controller for fuel cell 10 stores the impedance Z of the fuel cell stack 6 received in this way in the unillustrated memory.

As described above, the power conditioning system 1 of the present embodiment includes the fuel cell stack 6 (fuel cell) connected to the drive motor 2 (including the drive inverter 3) serving as a load, the DC/DC converter (multiphase converter) 5 for the fuel cell stack 6 connected between the fuel cell stack 6 and the drive inverter 3 and configured to convert the output voltage of the fuel cell stack 6 at the predetermined required voltage ratio, the high-energy battery (secondary battery) 20 connected to the drive motor 2 in parallel to the fuel cell stack 6 and serving as a power supply source different from the fuel cell stack 6, the impedance measuring device 200 configured to measure the impedance of the fuel cell stack 6 by outputting alternating currents between the positive electrode and the intermediate point of the fuel cell stack 6 and between the intermediate point and the negative electrode of the fuel cell stack 6, the current bypass path BR coupling the fuel cell stack 6 and the drive motor 2 (drive inverter 3) while bypassing the DC/DC converter 5 for the fuel cell stack 6, and the current cut-off unit (diode 100) configured to electrically cut off the current bypass path BR when the impedance of the fuel cell stack 6 is measured by the impedance measuring device 200. Since the power conditioning system 1 of the present embodiment has this configuration, the following functions and effects are achieved.

Since the current bypass path BR is electrically cut off by the current cut-off unit in measuring the impedance of the fuel cell stack 6 (hereinafter, referred to as "in impedance measurement"), a current flowing along the current bypass path BR in impedance measurement decreases. Thus, normal noise generated from the drive motor 2, the drive inverter 3 and the like can be reduced by increasing the impedance of the DC/DC converter 5 viewed from the side of the drive motor 2.

On the other hand, when the impedance of the fuel cell stack 6 is not measured (hereinafter, referred to as "in impedance non-measurement"), a part of the output current (most of the output current depending on the device configuration) of the fuel cell stack 6 flows along the current bypass path BR. Thus, an impedance of the entire power conditioning system 1 can be reduced.

Since the power conditioning system 1 of the present embodiment has such functions, it is possible to accurately measure the impedance of the fuel cell stack 6 using the impedance measuring device 200 and improve the power generation efficiency of the fuel cell stack 6 if the impedance of the fuel cell stack 6 needs not be measured.

In the power conditioning system 1 of the present embodiment, the DC/DC converter 5 for the fuel cell stack 6 is configured to boost the output voltage of the fuel cell stack 6 when the impedance of the fuel cell stack 6 is measured by the impedance measuring device 200. By employing such a configuration, in impedance measurement of the fuel cell stack 6, the impedance of the DC/DC converter 5 viewed from the side of the drive motor 2 can be further increased and normal noise generated from the drive motor 2, the drive inverter 3 and the like can be further reduced. Thus, the power generation efficiency of the fuel cell stack 6 can be improved while the impedance measurement accuracy of the impedance measuring device 200 as described above is ensured.

Further, in the power conditioning system 1 of the present embodiment, the current cut-off unit (diode 100) is configured to cut off the flow of the current from the drive inverter 3 to the fuel cell stack 6 when the output voltage of the fuel cell stack 6 is being boosted by the DC/DC converter 5 for the fuel cell stack 6. By employing such a configuration, in impedance measurement of the fuel cell stack 6, the impedance of the DC/DC converter 5 viewed from the side of the drive motor 2 can be increased and normal noise generated from the drive motor 2, the drive inverter 3 and the like can be reduced. Further, since the output voltage of the fuel cell stack 6 is not boosted by the DC/DC converter 5 when the impedance of the fuel cell stack 6 is not being measured, the impedance of the DC/DC converter 5 can be reduced by increasing the amount of the current flowing along the current bypass path BR. In this way, the power generation efficiency of the fuel cell stack 6 can be improved while the impedance measurement accuracy of the impedance measuring device 200 as described above is ensured.

Further, in the power conditioning system 1 of the present embodiment, the current cut-off unit may be constituted by the diode 100. This enables the current cut-off to be realized only by an inexpensive passive element without using an active element such as a switching element.

Also, the power conditioning system 1 of the present embodiment further includes the DC/DC converter 8 for the battery 20 connected between the battery 20 and the drive inverter 3 and configured to convert the output voltage of the battery 20 at the predetermined required voltage ratio, and the DC/DC converter 8 for the battery 20 is configured to set the input voltage of the drive inverter 3 (DC link voltage) higher than the output voltage of the fuel cell stack 6 by the predetermined voltage (margin) β when the impedance of the fuel cell stack 6 is measured by the impedance measuring device 200. By setting the DC link voltage high in impedance measurement of the fuel cell stack 6, the boosting operation of the DC/DC converter 5 for the fuel cell stack 6 can be performed. This enables the output voltage of the fuel cell stack 6 to be boosted without changing the output current of the fuel cell stack 6. Specifically, since the output current of the fuel cell stack 6 needs not be reduced in impedance measurement of the fuel cell stack 6, the power generation efficiency of the fuel cell stack 6 can be enhanced. Further, by employing such a configuration, the power generation efficiency of the fuel cell stack 6 can be improved while the impedance measurement accuracy of the impedance measuring device 200 is ensured by a simple control.

The power conditioning system 1 of the present embodiment further includes the DC/DC converter 8 for the battery 20 connected between the battery 20 and the drive inverter 3 and configured to convert the output voltage of the battery 20 at the predetermined required voltage ratio, and the DC/DC converter 8 for the battery 20 is configured to set the input voltage of the drive inverter 3 (DC link voltage) higher than the output voltage of the fuel cell stack 6 by the predetermined voltage (margin) β when the impedance of the fuel cell stack 6 is measured by the impedance measuring device 200. This enables the output voltage of the fuel cell stack 6 to be boosted without changing the output current of the fuel cell stack 6 by a simple control of the power conditioning system 1. In this case, instead of setting the input voltage of the drive inverter 3 (DC link voltage) high, the DC/DC converter 8 for the battery 20 may set the target voltage (step-up ratio) of the DC/DC converter 8 high. This enables the power generation efficiency of the fuel cell stack 6 to be improved while the impedance measurement accuracy of the impedance measuring device 200 is ensured by a simple control, in addition to the above effects.

A control method for the power conditioning system 1 of the present embodiment with the fuel cell stack 6 (fuel cell) connected to the drive motor 2 (including the drive inverter 3) serving as a load, the DC/DC converter (multi-phase converter) 5 for the fuel cell stack 6 connected between the fuel cell stack 6 and the drive inverter 3 and configured to convert the output voltage of the fuel cell stack 6 at the predetermined required voltage ratio, the high-energy battery (secondary battery) 20 connected to the drive motor 2 in parallel to the fuel cell stack 6 and serving as a power supply source different from the fuel cell stack 6, the impedance measuring device 200 configured to measure the impedance of the fuel cell stack 6 by outputting alternating currents between the positive electrode and the intermediate point of the fuel cell stack 6 and between the intermediate point and the negative electrode of the fuel cell stack 6, the current bypass path BR coupling the fuel cell stack 6 and the drive motor 2 (drive inverter 3) while bypassing the DC/DC converter 5 for the fuel cell stack 6, and the current cut-off unit (diode 100) configured to electrically cut off the current bypass path BR when the impedance of the fuel cell stack 6 is measured by the impedance measuring device 200, whereby the output voltage of the fuel cell stack 6 is boosted by the DC/DC converter 5 for the fuel cell stack 6, the first impedance Z1 from the positive electrode terminal 6B to the intermediate terminal 6C of the fuel cell stack 6 is measured by outputting an alternating current between the positive electrode terminal 6B and the intermediate terminal 6C of the fuel cell stack 6 by the alternating-current adjustment unit 218, the second impedance Z2 from the intermediate terminal 6C to the negative electrode terminal 6A of the fuel cell stack 6 is measured by outputting an alternating current between the intermediate terminal 6C and the negative electrode terminal 6A of the fuel cell stack 6 by the alternating-current adjustment unit 218, and the impedance Z of the fuel cell stack 6 is measured by adding the first and second impedances Z1, Z2. By executing the control method for the power conditioning system 1 in this way, the aforementioned effects can be achieved.

Although the embodiment of the present invention has been described above, the above embodiment is merely an illustration of one application example of the present invention and not intended to limit the technical scope of the present invention to the specific configuration of the above embodiment.

In the above embodiment, the impedance measuring device 200 includes the impedance computation unit 220 inside and is configured to compute the impedance of the fuel cell stack 6. However, the present invention is not limited to such a configuration. For example, when the alternating-current potential differences V1 and V2 are equal to the predetermined value in Step S1012 of the impedance computation process by the AC bridge of FIG. 12, these alternating-current potential differences V1, V2 and the alternating currents I1, I2 may be output to the controller for fuel cell 10 and the controller for fuel cell 10 may be configured to measure the impedance of the fuel cell stack 6.

In the above embodiment, the power conditioning system 1 is configured such that the controller for fuel cell 10 outputs the impedance calculation request to the impedance measuring device 200 and the impedance measuring device 200 measures the impedance of the fuel cell stack 6 in response to that request if the wet state of the fuel cell stack 6 reaches the state of poor power generation ("Yes" in Step S601 of the FC impedance calculation request process). However, the present invention is not limited to such a configuration. The impedance measuring device 200 may measure the impedance of the fuel cell stack 6 at predetermined time intervals or may constantly measure the impedance of the fuel cell stack 6 regardless of the presence or absence of the impedance calculation request. In the case of constantly measuring the impedance of the fuel cell stack 6, the impedance computation unit 220 may be realized by an analog computation circuit using an analog computation IC as described above.

Further, in the above embodiment, the impedance measuring device 200 is configured to repeat the processings from Step S1002 until both the positive electrode side alternating-current potential difference V1 and the negative electrode side alternating-current potential difference V2 become equal to the predetermined value in Step S1012 of the impedance computation process by the AC bridge. However, the present invention is not limited to such a configuration. The impedance measuring device 200 may be configured to finish this impedance computation process by the AC bridge and return to the main process flow if it is determined that either one of the positive electrode side alternating-current potential difference V1 and the negative electrode side alternating-current potential difference V2 is not equal to the predetermined value and to perform similar processings when the main process flow is executed next time.

In the above embodiment, the controller for fuel cell 10 is configured to increase the amount of the current flowing along the current bypass path BR without boosting by the multi-phase converter 5 if the impedance of the fuel cell stack 6 is not being measured by the impedance measuring device 200. However, the present invention is not limited to such a configuration. If necessary, according to a load request of the drive motor 2, boosting by the multi-phase converter 5 may be performed also in impedance non-measurement.

In the above embodiment, a case has been described where the multi-phase converter 5 is used as the DC/DC converter for boosting the output voltage of the fuel cell stack 6. However, the present invention is not limited to this. A single-phase converter like the DC/DC converter 8 may be used as the DC/DC converter for the fuel cell stack 6.

Contrary to that, the DC/DC converter 8 for boosting the output voltage of the battery 20 may be constituted by a multi-phase converter.

The invention claimed is:
1. A power conditioning system, comprising:
a fuel cell connected to a load;

a fuel cell converter connected between the fuel cell and the load, the fuel cell converter converting an output voltage of the fuel cell at a predetermined required voltage ratio;

a battery connected to the load in parallel to the fuel cell, the battery serving as a power supply source different from the fuel cell;

an impedance measuring device configured to measure an impedance of the fuel cell by outputting alternating currents between a positive electrode and an intermediate point of the fuel cell and between the intermediate point and a negative electrode of the fuel cell;

a current bypass path configured to couple the fuel cell and the load while bypassing the fuel cell converter; and a current cut-off unit configured to provide on the current bypass path, the current cut-off unit electrically cutting off the current bypass path when the impedance of the fuel cell is measured by the impedance measuring device.

2. The power conditioning system according to claim 1, wherein:
the fuel cell converter increases the output voltage of the fuel cell when the impedance of the fuel cell is measured by the impedance measuring device.

3. The power conditioning system according to claim 1, wherein:
the current cut-off unit is configured to cut off the flow of a current from the load to the fuel cell when the output voltage of the fuel cell is being increased by the fuel cell converter.

4. The power conditioning system according to claims 1, wherein:
the current cut-off unit includes a diode.

5. The power conditioning system according to claims 1, further comprising:
a battery converter connected between the battery and the load, the battery converter converting an output voltage of the battery at a predetermined required voltage ratio, wherein:
the battery converter sets a voltage on the load side to be higher than the output voltage of the fuel cell when the impedance of the fuel cell is measured by the impedance measuring device.

6. The power conditioning system according to claims 1, further comprising:
a battery converter connected between the battery and the load, the battery converter converting an output voltage of the battery at a predetermined required voltage ratio, wherein:
the battery converter sets a target voltage of the battery converter to be higher than the output voltage of the fuel cell when the impedance of the fuel cell is measured by the impedance measuring device.

7. A control method for a power conditioning system with:
a fuel cell connected to a load;
a fuel cell converter connected between the fuel cell and the load, the fuel cell converter converting an output voltage of the fuel cell at a predetermined required voltage ratio;
a battery connected to the load in parallel to the fuel cell, the battery serving as a power supply source different from the fuel cell;
an impedance measuring device configured to measure an impedance of the fuel cell;
a current bypass path configured to couple the fuel cell and the load while bypassing the fuel cell converter; and
a current cut-off unit configured to provide on the current bypass path, the current cut-off unit electrically cutting off the current bypass path when the impedance of the fuel cell is measured by the impedance measuring device,
the control method comprising:
increasing the output voltage of the fuel cell by the fuel cell converter;
measuring a first impedance from a positive electrode to an intermediate point of the fuel cell by outputting an alternating current between the positive electrode and the intermediate point of the fuel cell;
measuring a second impedance from the intermediate point to a negative electrode of the fuel cell by outputting an alternating current between the intermediate point and the negative electrode of the fuel cell; and
measuring an impedance of the fuel cell by adding the first impedance and the second impedance.

* * * * *